US008316081B2

(12) United States Patent
Svendsen

(10) Patent No.: US 8,316,081 B2
(45) Date of Patent: Nov. 20, 2012

(54) PORTABLE MEDIA PLAYER ENABLED TO OBTAIN PREVIEWS OF A USER'S MEDIA COLLECTION

(75) Inventor: Hugh Svendsen, Chapel Hill, NC (US)

(73) Assignee: Domingo Enterprises, LLC, Wilmington, DE (US)

( * ) Notice: Subject to any disclaimer, the term of this patent is extended or adjusted under 35 U.S.C. 154(b) by 149 days.

(21) Appl. No.: 11/403,467

(22) Filed: Apr. 13, 2006

(65) Prior Publication Data

US 2007/0244984 A1 Oct. 18, 2007

(51) Int. Cl.
*G06F 15/16* (2006.01)
(52) U.S. Cl. ......... 709/203; 709/204; 709/205; 709/206
(58) Field of Classification Search .................. 709/216, 709/219, 230, 232, 238, 200, 203
See application file for complete search history.

(56) References Cited

U.S. PATENT DOCUMENTS

| | | | |
|---|---|---|---|
| 5,237,157 A | 8/1993 | Kaplan | |
| 5,654,886 A | 8/1997 | Zereski, Jr. et al. | |
| 5,740,549 A | 4/1998 | Reilly et al. | |
| 5,751,282 A | 5/1998 | Girard et al. | |
| 5,907,617 A | 5/1999 | Ronning | |
| 5,918,213 A | 6/1999 | Bernard et al. | |
| 5,926,624 A | 7/1999 | Katz et al. | |
| 5,956,716 A | 9/1999 | Kenner et al. | |
| 5,963,916 A | 10/1999 | Kaplan | |
| 6,020,883 A | 2/2000 | Herz et al. | |
| 6,072,934 A | 6/2000 | Abecassis | |
| 6,088,722 A | 7/2000 | Herz et al. | |
| 6,226,618 B1 | 5/2001 | Downs et al. | |
| 6,269,394 B1 | 7/2001 | Kenner et al. | |
| 6,363,357 B1 | 3/2002 | Rosenberg et al. | |
| 6,385,596 B1 | 5/2002 | Wiser et al. | |
| 6,629,197 B1 | 9/2003 | Bhogal et al. | |
| 6,633,845 B1 | 10/2003 | Logan et al. | |
| 6,662,231 B1 | 12/2003 | Drosset et al. | |
| 6,693,236 B1 | 2/2004 | Gould et al. | |

(Continued)

FOREIGN PATENT DOCUMENTS

CN 1637742 7/2005

(Continued)

OTHER PUBLICATIONS

International Search Report for PCT/US07/66498 mailed Feb. 8, 2008.

(Continued)

*Primary Examiner* — Kenny Lin
*Assistant Examiner* — Shaq Taha
(74) *Attorney, Agent, or Firm* — Withrow & Terranova, PLLC

(57) ABSTRACT

A system and method for providing previews of media files from a user's media collection to an associated portable media player are provided. In general, media files from the user's media collection are selected based on a play history of the user and optionally a user profile of the user. Once the media files are selected, previews of the media files are generated. The previews may then be transferred to the portable media player during a docking, or synchronization, process. Thereafter, the previews may be played by the portable media player and, if desired, selected by the user for transfer to the portable media player. The media files corresponding to the selected previews are then transferred to the portable media player during a subsequent synchronization process.

19 Claims, 14 Drawing Sheets

U.S. PATENT DOCUMENTS

| | | |
|---|---|---|
| 6,834,308 B1 | 12/2004 | Ikezoye et al. |
| 6,868,440 B1 | 3/2005 | Gupta et al. |
| 6,904,592 B1 | 6/2005 | Johnson |
| 6,941,353 B1 | 9/2005 | Lane |
| 6,947,922 B1 | 9/2005 | Glance |
| 6,990,453 B2 | 1/2006 | Wang et al. |
| 7,007,273 B2 | 2/2006 | Cashin et al. |
| 7,046,956 B1 | 5/2006 | Cohen |
| 7,046,997 B2 | 5/2006 | Bahr |
| 7,054,888 B2 | 5/2006 | LaChapelle et al. |
| 7,061,482 B2 | 6/2006 | Ferris |
| 7,081,579 B2 | 7/2006 | Alaclde et al. |
| 7,107,045 B1 | 9/2006 | Knoop |
| 7,127,120 B2 | 10/2006 | Hua et al. |
| 7,212,666 B2 | 5/2007 | Zhang et a |
| 7,283,880 B2 | 10/2007 | Dick |
| 7,325,043 B1 | 1/2008 | Rosenberg et al. |
| 7,333,712 B2 | 2/2008 | Jeannin et al. |
| 7,343,414 B2 | 3/2008 | Lipscomb et al. |
| 7,379,875 B2 | 5/2008 | Burges et al. |
| 7,380,135 B2 | 5/2008 | Nishimoto et al. |
| 7,386,357 B2 | 6/2008 | Zhang |
| 7,536,565 B2 | 5/2009 | Girish et al. |
| 7,685,158 B2 * | 3/2010 | Pilgrim et al. ......... 707/999.107 |
| 7,827,236 B2 | 11/2010 | Ferris |
| 2001/0047516 A1 | 11/2001 | Swain et al. |
| 2002/0002039 A1 | 1/2002 | Qureshey et al. |
| 2002/0002541 A1 | 1/2002 | Williams |
| 2002/0032019 A1 | 3/2002 | Marks et al. |
| 2002/0032747 A1 | 3/2002 | Toki |
| 2002/0059363 A1 * | 5/2002 | Katz et al. ..................... 709/203 |
| 2002/0083459 A1 | 6/2002 | Kondo et al. |
| 2002/0099660 A1 | 7/2002 | Lee |
| 2002/0103796 A1 | 8/2002 | Hartley |
| 2002/0104019 A1 | 8/2002 | Chatani et al. |
| 2002/0116277 A1 | 8/2002 | Kraft |
| 2002/0129693 A1 | 9/2002 | Wilks |
| 2002/0146122 A1 | 10/2002 | Vestergaard et al. |
| 2002/0152876 A1 | 10/2002 | Hughes et al. |
| 2003/0005429 A1 | 1/2003 | Colsey |
| 2003/0028424 A1 | 2/2003 | Kampff et al. |
| 2003/0033214 A1 | 2/2003 | Mikkelsen et al. |
| 2003/0065520 A1 | 4/2003 | Jutzi et al. |
| 2003/0065802 A1 * | 4/2003 | Vitikainen et al. ........... 709/231 |
| 2003/0120541 A1 | 6/2003 | Siann et al. |
| 2003/0126605 A1 | 7/2003 | Betz et al. |
| 2003/0182277 A1 | 9/2003 | Kurakake |
| 2003/0224823 A1 | 12/2003 | Hurst et al. |
| 2003/0226030 A1 | 12/2003 | Hurst et al. |
| 2003/0236714 A1 | 12/2003 | Kageyama |
| 2004/0006634 A1 | 1/2004 | Ferris |
| 2004/0034441 A1 | 2/2004 | Eaton et al. |
| 2004/0064209 A1 | 4/2004 | Zhang |
| 2004/0064374 A1 | 4/2004 | Cho |
| 2004/0085341 A1 | 5/2004 | Hua et al. |
| 2004/0098341 A1 | 5/2004 | Urich et al. |
| 2004/0107821 A1 | 6/2004 | Alcalde et al. |
| 2004/0154459 A1 | 8/2004 | Ikeda et al. |
| 2004/0158865 A1 | 8/2004 | Kubler et al. |
| 2004/0199527 A1 | 10/2004 | Morain et al. |
| 2004/0199654 A1 | 10/2004 | Juszkiewicz |
| 2004/0216108 A1 | 10/2004 | Robbin |
| 2004/0221308 A1 | 11/2004 | Cuttner et al. |
| 2004/0223606 A1 | 11/2004 | Enete et al. |
| 2004/0225519 A1 * | 11/2004 | Martin ............................... 705/1 |
| 2004/0255334 A1 | 12/2004 | Logan |
| 2004/0255340 A1 | 12/2004 | Logan |
| 2004/0266336 A1 | 12/2004 | Patsiokas et al. |
| 2004/0267390 A1 | 12/2004 | Ben-Yaacov et al. |
| 2005/0021414 A1 | 1/2005 | Liebenow |
| 2005/0033699 A1 | 2/2005 | Umeo et al. |
| 2005/0034082 A1 * | 2/2005 | Kim ............................... 715/828 |
| 2005/0038753 A1 | 2/2005 | Yen et al. |
| 2005/0039206 A1 * | 2/2005 | Opdycke ......................... 725/35 |
| 2005/0060240 A1 | 3/2005 | Popofsky |
| 2005/0081237 A1 | 4/2005 | Chen et al. |
| 2005/0091107 A1 | 4/2005 | Blum |
| 2005/0098023 A1 | 5/2005 | Toivonen et al. |
| 2005/0120126 A1 | 6/2005 | Gupta et al. |
| 2005/0159956 A1 | 7/2005 | Rui et al. |
| 2005/0183115 A1 | 8/2005 | Maruyama et al. |
| 2005/0195695 A1 | 9/2005 | Yanase et al. |
| 2005/0210507 A1 | 9/2005 | Hawkins et al. |
| 2005/0227773 A1 | 10/2005 | Lu et al. |
| 2005/0246375 A1 | 11/2005 | Manders et al. |
| 2005/0267818 A1 | 12/2005 | Kaplan |
| 2005/0273438 A1 | 12/2005 | Yen et al. |
| 2005/0276570 A1 | 12/2005 | Reed, Jr. et al. |
| 2005/0278380 A1 | 12/2005 | Ferris |
| 2006/0008256 A1 * | 1/2006 | Khedouri et al. ............. 386/124 |
| 2006/0010467 A1 | 1/2006 | Segel |
| 2006/0015201 A1 | 1/2006 | Lapstun et al. |
| 2006/0020890 A1 | 1/2006 | Kroll et al. |
| 2006/0053447 A1 * | 3/2006 | Krzyzanowski et al. ....... 725/40 |
| 2006/0056324 A1 | 3/2006 | Hyyppa et al. |
| 2006/0064716 A1 | 3/2006 | Sull et al. |
| 2006/0094492 A1 | 5/2006 | Wolfe |
| 2006/0095339 A1 | 5/2006 | Hayashi et al. |
| 2006/0107330 A1 | 5/2006 | Ben-Yaacov et al. |
| 2006/0111920 A1 | 5/2006 | Jacobs et al. |
| 2006/0123335 A1 * | 6/2006 | Sanchez et al. ............... 715/517 |
| 2006/0143236 A1 | 6/2006 | Wu |
| 2006/0168351 A1 * | 7/2006 | Ng et al. ....................... 709/248 |
| 2006/0173974 A1 | 8/2006 | Tang |
| 2006/0190413 A1 * | 8/2006 | Harper ............................ 705/65 |
| 2006/0195205 A1 * | 8/2006 | Ito .................................. 700/94 |
| 2006/0195462 A1 | 8/2006 | Rogers |
| 2006/0195512 A1 | 8/2006 | Rogers et al. |
| 2006/0195513 A1 | 8/2006 | Rogers et al. |
| 2006/0195514 A1 | 8/2006 | Rogers et al. |
| 2006/0195515 A1 | 8/2006 | Beaupre et al. |
| 2006/0195516 A1 | 8/2006 | Beaupre |
| 2006/0195789 A1 | 8/2006 | Rogers et al. |
| 2006/0195790 A1 | 8/2006 | Beaupre et al. |
| 2006/0230038 A1 | 10/2006 | Silverman et al. |
| 2006/0235550 A1 | 10/2006 | Csicsatka et al. |
| 2006/0242106 A1 | 10/2006 | Bank |
| 2006/0242681 A1 | 10/2006 | Brain et al. |
| 2006/0265421 A1 | 11/2006 | Ranasinghe et al. |
| 2006/0265503 A1 | 11/2006 | Jones et al. |
| 2006/0268667 A1 | 11/2006 | Jellison, Jr. et al. |
| 2006/0271594 A1 | 11/2006 | Haberman |
| 2006/0282859 A1 | 12/2006 | Garbow et al. |
| 2006/0293771 A1 | 12/2006 | Tazine et al. |
| 2007/0006262 A1 | 1/2007 | Cleron et al. |
| 2007/0025194 A1 | 2/2007 | Morse et al. |
| 2007/0036470 A1 | 2/2007 | Piersol et al. |
| 2007/0043766 A1 | 2/2007 | Nicholas et al. |
| 2007/0050458 A1 * | 3/2007 | Rotzoll et al. ................. 709/206 |
| 2007/0058674 A1 | 3/2007 | Bucher et al. |
| 2007/0060099 A1 | 3/2007 | Ramer et al. |
| 2007/0078660 A1 | 4/2007 | Ferris |
| 2007/0078993 A1 | 4/2007 | Issa |
| 2007/0094081 A1 | 4/2007 | Yruski et al. |
| 2007/0101039 A1 | 5/2007 | Rutledge et al. |
| 2007/0105588 A1 * | 5/2007 | Issa .............................. 455/556.1 |
| 2007/0106726 A1 * | 5/2007 | Rosenberg .................... 709/204 |
| 2007/0130585 A1 | 6/2007 | Perret et al. |
| 2007/0136750 A1 | 6/2007 | Abanami et al. |
| 2007/0162395 A1 * | 7/2007 | Ben-Yaacov et al. ........... 705/51 |
| 2007/0168540 A1 | 7/2007 | Hansson |
| 2007/0169087 A1 | 7/2007 | Fadell |
| 2007/0206247 A1 | 9/2007 | Kaplan |
| 2007/0219937 A1 * | 9/2007 | Lee et al. .......................... 707/1 |
| 2007/0220100 A1 | 9/2007 | Rosenberg |
| 2007/0230703 A1 | 10/2007 | Barrus et al. |
| 2007/0245242 A1 | 10/2007 | Yagnik |
| 2007/0248311 A1 * | 10/2007 | Wice et al. ...................... 386/52 |
| 2008/0005348 A1 | 1/2008 | Kosiba et al. |
| 2008/0016533 A1 | 1/2008 | Rothschild |
| 2008/0212941 A1 | 9/2008 | Lillethun et al. |
| 2008/0288536 A1 | 11/2008 | Pfeiffer et al. |

FOREIGN PATENT DOCUMENTS

| | | |
|---|---|---|
| GB | 2369022 B | 6/2003 |
| WO | 2004/097832 A2 | 11/2004 |
| WO | 2005039160 A1 | 4/2005 |

OTHER PUBLICATIONS

International Search Report for PCT/US07/66500 mailed Feb. 15, 2008.

"Amazon.com: Online Shopping for Electronics, Apparel, Computers, Books, DVDs, & m . . . ," http://www.amazon.com/, copyright 1996-2007 Amazon.com, Inc. or its affiliates, printed Oct. 8, 2007, 4 pages.

"Apple—iTunes—iTunes Store," http://www.apple.com/itunes/store/, printed Oct. 8, 2007, 1 page.

"Apple—iPod classic," http://www.apple.com/ipodclassic/, printed Oct. 26, 2007, 1 page.

"MP3—Wikipedia, the free encyclopedia," http://en.wikipedia.org/wiki/MPEG-1_Audio_Layer_III, printed Nov. 28, 2007, 7 pages.

"IEEE 802.11—Wlkipedia, the free encyclopedia," http://en.wikipedia.org/wiki/IEEE_802.11, printed Oct. 26, 2007, 5 pages.

"Advanced Audio Coding—Wikipedia, the free encyclopedia," http://en.wikipedia.org/wiki/Advanced_Audio_Coding, printed Nov. 28, 2007, 9 pages.

"Bluetooth.com—Learn," http://www.bluetooth.com/Bluetooth/Learn/, copyright 2007 Bluetooth SIG, Inc., printed Oct. 26, 2007, 1 page.

"ZigBee—Wikipedia, the free encyclopedia," http://en.wikipedia.org/wiki/ZigBee, printed Nov. 28, 2007, 5 pages.

Ron White, "How Computers Work," Millennium Edition, copyright 1999 Que Corporation, Sep. 1999, 93 pages.

Padilla et al., "Video Summaries Generation and Access via Personalized Delivery of Multimedia Presentations Adapted to Service and Terminal," International Journal of Intelligent Systems, vol. 21, Issue 7, Jul. 2006, John Wiley & Sons, Inc., New York, New York, pp. 785-800, 16 pages.

Sheth, A. et al., "VideoAnywhere: A System for Searching and Managing Distributed Heterogeneous Video Assets," SIGMOD Record, vol. 28, No. 1, Mar. 1999, pp. 104-109, found at <http://knoesis.wright.edu/library/download/SBS99-VideoAnywhere.pdf>, 6 pages.

Tseng et al., "Video Personalization and Summarization System," IEEE Workshop on Multimedia Signal Processing 2002, Dec. 9-11, 2002, St. Thomas, Virgin Islands, USA, copyright 2002, IEEE, pp. 424-427, 4 pages.

* cited by examiner

PORTABLE MEDIA PLAYER ENABLED TO OBTAIN PREVIEWS OF A USER'S MEDIA COLLECTION

FIELD OF THE INVENTION

The present invention relates to providing previews of media files from a user's media collection to an associated portable media player.

BACKGROUND OF THE INVENTION

Portable media players have become commonplace in today's society. When a user desires to transfer new media content, such as songs or videos, to his or her portable media player, the user must manually select the media content from his or her media collection stored on an associated personal computer. The issue with this traditional method for selecting and transferring media content to a portable media player is that the user must dedicate a significant amount of time to sitting at his or her personal computer. In today's busy world, this is not desirable. Thus, there is a need for a system and method for providing previews of a user's media collection to the user's portable media player. There is further a need for a system and method of selecting desired ones of the previews on the user's portable media player and transferring corresponding media files to the user's portable media player.

SUMMARY OF THE INVENTION

The present invention provides a system and method for providing previews of media files in a user's media collection to an associated portable media player. In general, media files from the user's media collection are selected based on a play history of the user and optionally a user profile. Once the media files are selected, previews of the media files are generated. The previews may then be transferred to the portable media player during a synchronization process. Thereafter, the previews may be played by the portable media player and, if desired, selected by the user for transfer to the portable media player. The media files corresponding to the selected previews are then transferred to the portable media player during a subsequent synchronization process.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENT

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to providing previews of media files in a user's media collection to an associated portable media player. In general, media files from the user's media collection are selected based on a play history of the user and optionally a user profile. The user profile may include information identifying previews previously provided to the portable media player, information identifying previews previously selected by the user of the portable media player, demographic information, user preferences, and the like. Once the media files are selected, previews of the media files are generated. The previews may then be transferred to the portable media player during a synchronization process. Thereafter, the previews may be played by the portable media player and, if desired, selected by the user for transfer to the portable media player. The media files corresponding to the selected previews are then transferred to the portable media player during a subsequent synchronization process.

Figure 1:
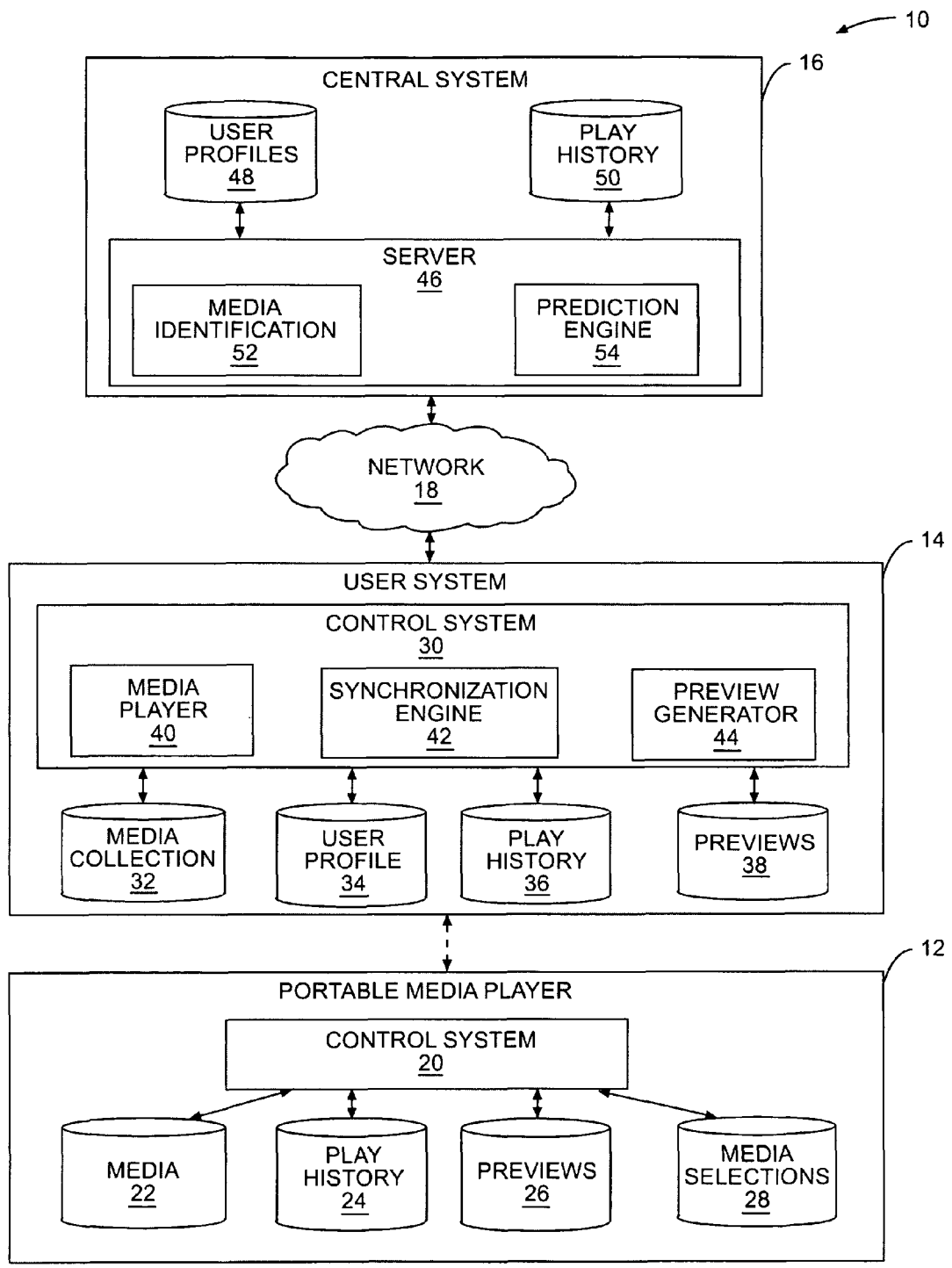
FIG. 1 illustrates a system for providing previews of media files in a user's media collection to a portable media player according to one embodiment of the present invention.

FIG. 1 illustrates a system 10 for providing previews to a portable media player 12 according to one embodiment of the present invention. In general, the system 10 includes the portable media player 12, a user system 14, and a central system 16. The user system 14 and the central system 16 are communicatively coupled by a network 18, which is preferably a distributed, public access network, such as the Internet. The portable media player 12 may be a device similar to an Apple iPod and may be enabled to play audio content such as songs, video content such as movies or television programs, or both audio and video content. The portable media player 12 generally includes a control system 20 and a number of databases 22-28. While the databases 22-28 are illustrated separately for clarity, it is to be understood that they may be implemented in one or more storage units such as, but not limited to, a hard-disc drive, Random-Access Memory (RAM), or the like.

The databases 22-28 include a media database 22, a play history database 24, a previews database 26, and a media selections database 28. The media database 22 operates to store a number of media files, such as song files and video files, which may be selected and played by the portable media player 12. Generally, the media files include media content encoded with an encoding algorithm such as, but not limited to, a Moving Pictures Expert Group (MPEG) Layer 3 (MP3) encoding algorithm, an Advanced Audio Coding (AAC) algorithm, an MPEG audio/video encoding algorithm, an Audio Video Interleave (AVI) audio/video encoding algorithm, or the like. The media content may be a song, movie, television program, or the like.

The play history database 24 operates to store a play history of the portable media player 12. For each media file played by the portable media player 12, the play history includes an identifier and a time stamp identifying a time and date at which the media file was played. In one embodiment, the identifier is a Globally Unique Identifier (GUID) identifying the media content of the media file. For example, the GUID of a song file identifies the song. Note that if a media file is played multiple times, the play history may include a separate entry for each playing of the media file or multiple time stamps stored in association with the identifier of the media file.

The previews database 26 operates to store a number of previews of media content, such as previews of songs or videos. A preview is preferably a media file corresponding to a segment of media content, such as a thirty second segment of a song or a five minute segment of a movie or television program. As discussed below, the previews are previews of the media content of media files from the user's media collection, which is stored by the user system 14. In this embodiment, the media files from the user's media collection from which the previews are generated are selected by the central system 16 based on either a current or previous play history of the portable media player 12, a current or previous play history of the user system 14, a user profile of the user, or any combination thereof. The previews are provided to the portable media player 12 during a docking, or synchronization, process, wherein the portable media player 12 is communicatively coupled, or docked, to the user system 14 via a local wireless interface such as a Bluetooth or Zigbee interface or a wired interface such as a Universal Serial Bus (USB) or Firewire interface. The synchronization process may be performed when desired by the user to, for example, transfer media files to the portable media player 12 or charge a battery of the portable media player 12.

The previews stored in the previews database 26 may be played by the portable media player 12 and, if desired, selected by the user such that the corresponding media files from the user's media collection are transferred to the portable media player 12 during a subsequent synchronization process. Identifiers of the previews selected by the user are stored in the media selections database 28. The identifiers of the previews may be the GUIDs of the media content of the corresponding media files or any other identifiers of the corresponding media files.

The user system 14 may be a personal computer or the like associated with the portable media player 12. In general, the user system 14 includes a control system 30, a media collection database 32, a user profile database 34, a play history database 36, and a previews database 38. While the databases 32-38 are illustrated separately for clarity, they may be implemented in one or more storage units such as, but not limited to, one or more hard-disc drives.

The media collection database 32 operates to store a number of media files, such as song files and video files, corresponding to a media collection of the user associated with the user system 14 and the portable media player 12. The user profile database 34 operates to store the user profile of the user associated with the user system 14 and the portable media player 12. The user profile may include information identifying the user, information identifying previews previously provided to the portable media player 12, information identifying previews previously selected by the user of the portable media player 12, demographic information, user preferences, and the like. The information identifying the user may include, but is not limited to, name, address, email address, telephone number, and the like. The demographic information may include, but is not limited to, gender, age, marital status, and the like. The user preferences may include, but are not limited to, one or more favorite music or video genres, one or more favorite music artists, one or more favorite movies, one or more favorite television programs, and the like.

The play history database 36 operates to store a play history including an identifier, such as a GUID, and a time stamp for each media file played at the user system 14. In addition, the play history database 36 operates to store the play history from the portable media player 12, which may be provided to the user system 14 during a synchronization process.

The previews database 38 operates to store previews generated by the user system 14. As discussed below, the media files from which the previews are generated may be selected by the central system 16 based on the play history of the portable media player 12, the play history of the user system 14, the user profile of the user, or any combination thereof. Once generated, the previews may be stored in the previews database 38 and provided to the portable media player 12 during a synchronization process.

The control system 30 may be implemented in hardware, software, or a combination of hardware and software. In this embodiment, the control system 30 includes a media player 40, a synchronization engine 42, and a preview generator 44. The media player 40 may be implemented in hardware, software, or a combination of hardware and software and operates to play media files having media content such as, but not limited to, songs, movies, television programs, or the like.

The synchronization engine 42 may be implemented in hardware, software, or a combination of hardware and software and operates to effect a synchronization process between the user system 14 and the portable media player 12. More specifically, the synchronization process occurs when the portable media player 12 is communicatively coupled to the user system 14 via either a wired or wireless interface such as a wireless communication interface operating according to the Bluetooth standard, the Zigbee standard, one of the IEEE 802.11 standards, or the like, or a wired interface such as a USB or Firewire interface. During the synchronization process, data is exchanged between the user system 14 and the portable media player 12. More specifically, during the synchronization process, the play history of the portable media player 12 may be transferred from the portable media player 12 to the user system 14, preview selections may be transferred from the portable media player 12 to the user system 14, and media files and/or previews of media files may be transferred from the user system 14 to the portable media player 12. In addition, the user system 14 may, for example, instruct the portable media player 12 to delete previews or media files as desired by the user.

The preview generator 44 may be implemented in hardware, software, or a combination of hardware and software and operates to generate previews of select media files from the user's media collection. As discussed below, in this embodiment, the central system 16 operates to select media files from the user's media collection for which previews are to be generated. Identifiers of the select media files are provided to the user system 14. In response, the preview generator 44 operates to generate previews of the select media files. The previews are media files having media content corresponding to segments of the media content of the corresponding media files. For example, a preview of a song file may be a 30 second segment of the song. The segment may be any segment of the song such as, for example, the first 30 seconds of the song, the last 30 seconds of the song, or the 30 seconds of the song at a mid-point of the song. Likewise, a preview of a television program may be a segment corresponding to, for example, the first 5 minutes of the television program. The previews may be generated such that the previews are in the same format as the corresponding media file from the user's media collection, a default format, or a select format desired by the user. For example, if a song file is an MP3 file, the preview generator 44 may generate the preview of the song file in the MP3 format or in a default or user defined format such as the AAC format.

The central system 16 generally operates to select media files from the user's media collection, which is stored at the user system 14, for which previews are to be generated and provided to the portable media player 12. The central system 16 includes a server 46 and databases 48, 50. The server 46 is preferably implemented as a combination of hardware and software and includes a media identification application 52 and a prediction engine 54. Note that while a single server 46 is illustrated, the server 46 may be implemented as a number of distributed servers.

The media identification application 52 may be implemented in software or a combination of hardware and software. The media identification application 52 operates to identify the media content of the media files in the media collection stored at the user system 14 and assign corresponding identifiers, or GUIDs, to the media files. More specifically, the user system 14 provides identification parameters such as, but not limited to, metadata, such as ID3 tags, describing the media content of the media files; fingerprints of the media content of the media files; samples of the media content of the media files; file names; directory names; or the like or any combination thereof. In response, the media identification application 52 attempts to identify the media content of the media files based on the identification parameters.

For media files having media content identified by the media identification application 46, corresponding GUIDs identifying the media content are provided to the user system 14 and stored in association with the media files. For example, the GUIDs may be stored in the headers of the media files. Thereafter, the media files may be identified using the GUIDs. In addition, the GUIDs for the media files in the user's media collection may be stored at the central system 16 as information identifying the media files in the user's media collection. In one embodiment, the GUIDs identifying the media content of the media files in the user's media collection are stored as part of the user profile of the user associated with the portable media player 12 and the user system 14. It should be noted that while the GUIDs are the preferred method of identifying the media files in the user's media collection, the present invention is not limited thereto. Any type of identifier may be used.

The prediction engine 54 may be implemented in software, hardware, or a combination of hardware and software. In general, the prediction engine 54 operates to select one or more media files for which previews are to be generated and provided to the portable media player 12 based on the play history of the portable media player 12, the play history of the user system 14, the user profile of the user associated with the portable media player 12 and the user system 14, or any combination thereof. Note that if the portable media player 12 and the user system 14 do not yet have play histories, the prediction engine 54 may select the media files from the user's media collection either randomly or based on the user profile of the user.

The databases 48 and 50 include a user profiles database 48 and a play history database 50. The user profiles database 48 may include a user profile for each user registered with the central system 16, such as the user profile of the user associated with the portable media player 12 and the user system 14. The user profile of the user associated with the portable media player 12 and the user system 14 corresponds to the user profile stored in the user profile database 34 at the user system 14. Thus, in this embodiment, the user profile database 34 at the user system 14 is optional, but may be desired in some implementations.

The play history database 50 includes the play history of the portable media player 12 and, optionally, the play history of the user system 14, which are provided by the user system 14. The play histories of the portable media player 12 and the user system 14 stored in the play history database 50 correspond to the play histories stored in the play history database 36 at the user system 14. Thus, in this embodiment, the play history database 36 at the user system 14 is optional, but may be desired in some implementations.

As stated above, the network 18 is preferably a distributed, public access network, such as the Internet, wherein the user system 14 and the central system 16 are capable of interacting with and through the network 18 using various protocols such as Transmission Control Protocol/Internet Protocol (TCP/IP), Hypertext Transport Protocol (HTTP), and File Transfer Protocol (FTP). However, those of ordinary skill in the art will appreciate that the network 18 is not limited to thereto. More specifically, the network 18 may be any type of network suitable to allow interaction between the user system 14 and the central system 16. For example, the network 18 may be a wired network, a wireless network, or a combination thereof. Further, the network 18 may include a distributed computing network, an intranet, a local-area network (LAN) and/or a wide-area network (WAN), or any combination thereof.

Figure 2:
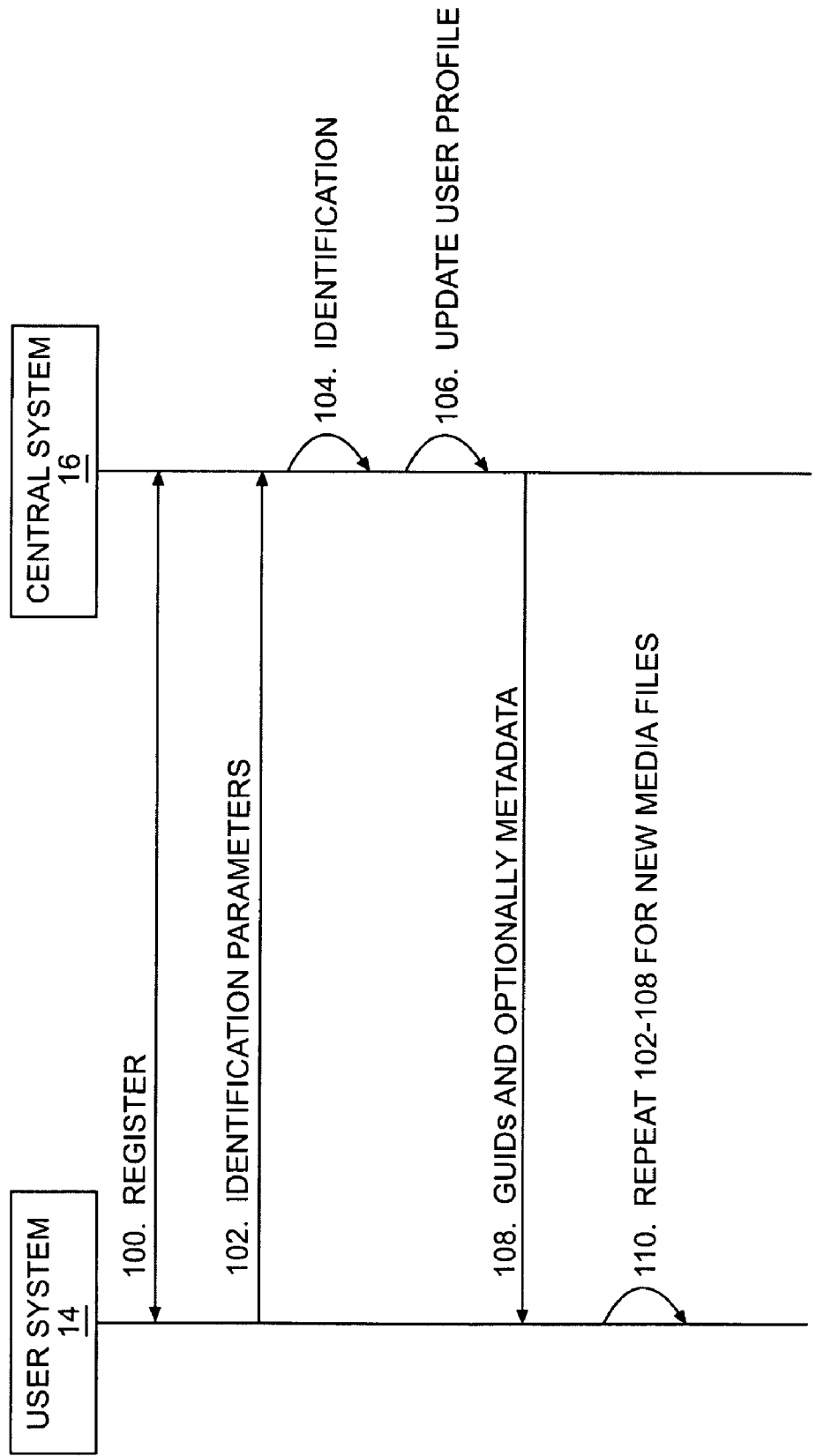
FIG. 2 illustrates the operation of the system of FIG. 1 to identify the media content of the media files in the user's media collection according to one embodiment of the present invention.

FIG. 2 illustrates the operation of the system 10 of FIG. 1 to identify the media content of the media files in the user's media collection according to one embodiment of the present invention. In general, the process begins when the user system 14 registers with the central system 16 (step 100). During the registration process, the user associated with the user system 14 may be requested to enter information such as identification information, demographic information, and user preferences. Based on this information, the server 46 generates the user profile of the user.

Next, the user system 14 provides identification parameters for each of the media files in the user's media collection to the central system 16 (step 102). As discussed above, the identification parameters may include, but are not limited to, metadata, such as ID3 tags, describing the media content of the media files; fingerprints of the media content of the media files; samples of the media content of the media files; file names; directory names; or the like or any combination thereof.

In response, the server 46, and more specifically the media identification application 52, attempts to identify the media content of the media files based on the identification parameters (step 104). The details of the operation of the media identification application 52 are not central to the present invention. However, in general, identification may be performed by comparing the identification parameters of the media files to like identification parameters of reference media files, wherein the reference media files or the identification parameters for the reference media files may be stored in association with the server 46. For example, the media identification application 52 may compare the fingerprints of the media files from the user's media collection to fingerprints of the reference media files. As a result, if the media content of the media file corresponds to the media content of one of the reference media files, the fingerprints will substantially match such that the media content of the media file is identified as the media content of the one of the reference media files. Likewise, samples of the media files may be used to generate fingerprints for the media files and used to identify the media content of the media files. In addition or alternatively, metadata, such as ID3 tags, may be used to identify the media files as ones of the reference media files.

For a more detailed discussion of generating fingerprints for a song and identifying the song based on the fingerprints, see U.S. Pat. No. 6,990,453, entitled SYSTEM AND METHODS FOR RECOGNIZING SOUND AND MUSIC SIGNALS IN HIGH NOISE AND DISTORTION, issued Jan. 24, 2006, which is hereby incorporated by reference in its entirety.

Once the media content of each of the media files in the user's media collection is identified, the server 46 operates to update the user profile of the user to include information identifying the media files in the user's media collection (step 106). Preferably, the information identifying the media files includes the GUIDs identifying the media content of the media files. However, the present invention is not limited thereto. Other identifiers for the media files may be used to identify the media files in the user's media collection. It should be noted that the media identification application 52 may be unable to identify the media content of some of the media files in the user's media collection, as will be apparent to one of ordinary skill in the art. The unidentified media files may optionally be ignored by the system 10 such that previews of the unidentified media files are not automatically provided to the portable media player 12 as disclosed herein.

The GUIDs for the media files and, optionally, metadata for the media files may then be provided to the user system 14 (step 108). The metadata may include information, such as ID3 tags, describing the media content of the media files. As an example, for a song, the metadata may include information such as, but not limited to, artist, album, title, genre, year released, lyrics, image of the album cover, and the like. Once the metadata is received by the user system 14, the metadata may be stored, for example, in the headers of the associated media files or used to correct the metadata already stored for the associated media files. For example, if a song is an MP3 file, the metadata may be used to create or correct the ID3 tags stored in the MP3 file. In addition, the metadata may be used to generate new file names for the media files or the like as will be apparent to one of ordinary skill in the art upon reading this disclosure.

At this point, steps 102-108 may be repeated when new media files are added to the user's media collection or when desired by the user (step 110).

Figure 3:
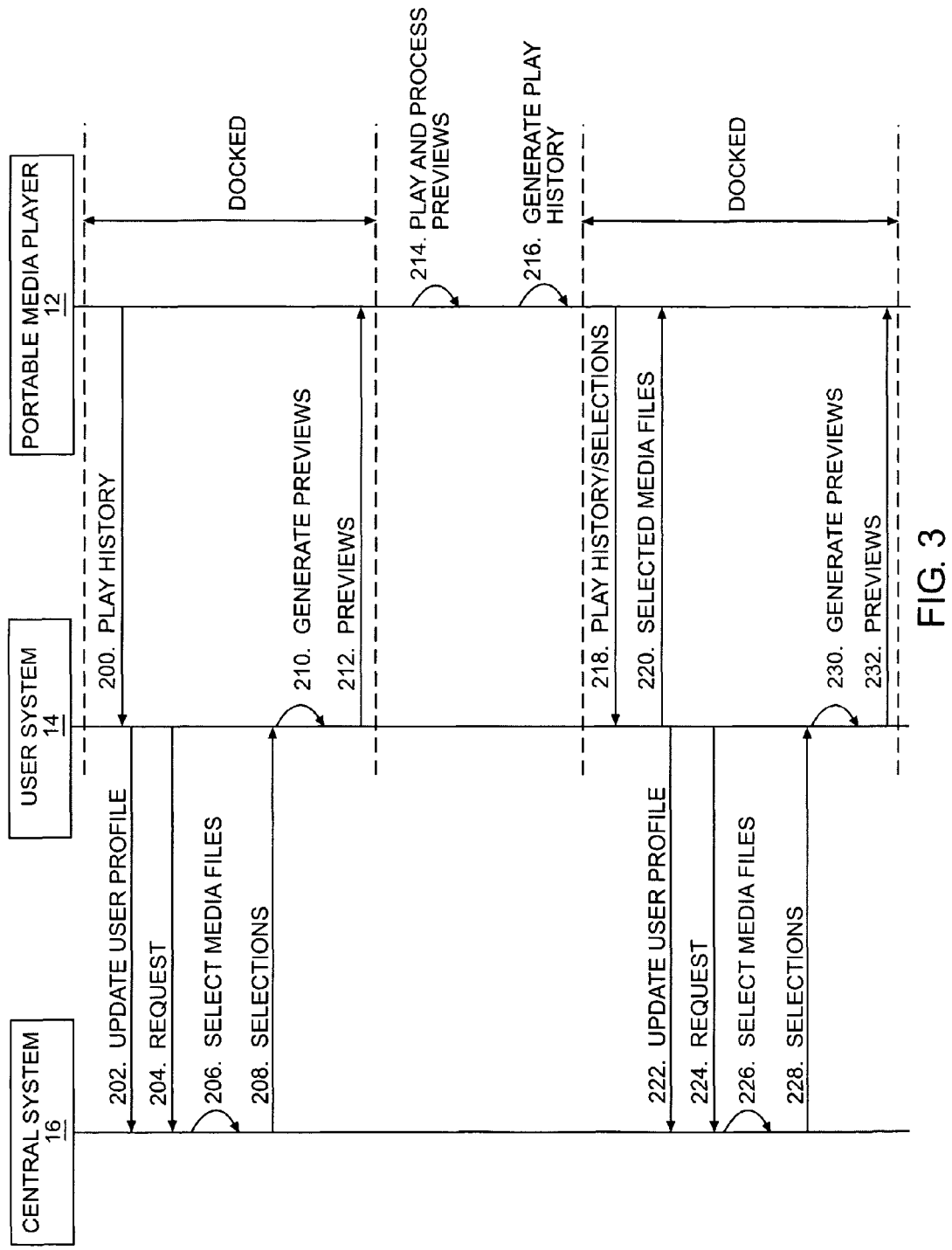
FIG. 3 illustrates the operation of the system of FIG. 1 to provide previews of media files in the user's media collection to the portable media player according to one embodiment of the present invention.

FIG. 3 illustrates the operation of the system 10 of FIG. 1 to provide previews of media files in the user's media collection to the portable media player 12 according to one embodiment of the present invention. First, during a first synchronization process, the play history of the portable media player 12 is provided to the user system 14 (step 200). Note that if, for example, the portable media player 12 is new, the play history of the portable media player 12 may be null or empty. It should also be noted that the play history may be the complete play history of the portable media player 12 or an update for the play history including a portion of the play history generated since the last transfer of the play history. As such, as used herein, "play history" is the entire play history or an update to the play history.

Upon receiving the play history, the user system 14 provides the play history of the portable media player 12 and, optionally, the play history of the user system 14 to the central system 16 in order to update the user profile of the user (step 202). The user system 14 may then send a request to the central system 16 to initiate the prediction engine 54 (step 204). Note that while steps 202 and 204 are illustrated as separate steps, they may be implemented in a single step wherein the play history of the portable media player 12 and, optionally, the play history of the user system 14 are provided in the request.

In response, the central system 16, and more specifically the prediction engine 54, selects a number of media files from the user's media collection to be previewed based on the play history of the portable media player 12, the play history of the user system 14, the user profile of the user, or any combination thereof (step 206). For example, if the play history of the portable media player 12 indicates that the user has recently listened to numerous songs from the 80s music genre, the central system 16 may select media files from the user's media collection from the 80s music genre. If the play history of the portable media player 12 and the play history of the user system 14 indicate that the user has recently viewed episodes of a particular television program, the central system 16 may select media files from the user's media collection corresponding to episodes of the television program or episodes of similar television programs. In addition, if the information identifying the media files in the media collection indicates that the user's media collection includes numerous songs from the Classic Rock music genre, the central system 16 may additionally select songs from the user's media collection from the Classic Rock music genre.

Still further, the prediction engine 54 may determine that the user has recently selected previews of songs by a particular artist at the portable media player 12 such that corresponding media files from the user's media collection have been transferred to the portable media player 12. As such, the prediction engine 54 may select other media files from the user's media collection by the same artist or by a similar artist. In a similar fashion, the prediction engine 54 may determine that the user has not selected previews of songs from a particular genre. As such, the prediction engine 54 may not select media files, or may reduce the number of media files selected, from that particular genre. These examples are not intended to limit the scope of the present invention. Numerous variations in how the play history of the portable media player 12, the play history of the user system 14, and the user profile of the user associated with the portable media player 12 and the user system 14 may be used to select media files from the user's media collection to preview will be apparent to one of ordinary skill in the art upon reading this disclosure.

The number of media files selected by the prediction engine 54 may be a default number such as ten, fifty, or a hundred. Alternatively, the number of media files selected by the prediction engine 54 may be defined by the user and stored, for example, in the user profile of the user. As another alternative, the number of media files to be selected by the prediction engine 54 may be provided to the central system 16 along with the play history, wherein the number is determined by the portable media player 12 or the user system 14 based on an amount of free storage space on the portable media player 12. This may be particularly beneficial where the media database 22 of the portable media player 12 is empty or nearly empty, such as when the portable media player 12 is first purchased. In this situation, previews of all or a substantial number of the media files in the user's media collection may be desirable. By having the previews stored on the portable media player 12, the user may select which media files from his or her media collection are to be transferred to the portable media player 12 by interacting with the portable media player 12 rather than the user system 14.

After selecting the media files to preview, the server 46 then provides identifiers of the selected media files, such as the GUIDs identifying the media content of the selected media files, to the user system 14 (step 208). The user system 14 then generates previews of the selected media files, as described above (step 210). Once generated, the previews are provided to the portable media player 12 (step 212). Note that in this embodiment, steps 200-212 are performed during a single synchronization process.

At this point, the synchronization process ends, and the portable media player 12 is undocked from the user system 14. While the portable media player 12 undocked, the previews may be played and processed on the portable media player 12 (step 214). More specifically, the previews may be played by the portable media player 12. Upon viewing or listening to each of the previews, the user may select the preview such that the preview is added to a list of media selections stored in the media selections database 28. By selecting the preview, the user indicates that the corresponding media file from the user's media collection is to be transferred to the portable media player 12 during the next synchronization process. The media selections stored in the media selections database 28 may be the identifiers, such as the GUIDs, of the selected previews, which may also be the identifiers, or GUIDs, for the corresponding media files in the user's media collection.

In addition to playing and processing the previews, the user may play desired ones of the media files stored in the media database 22. In response, a play history is generated (step 216). For each media file played, the play history preferably includes the GUID identifying the media content of the media file and a time stamp identifying a time and date at which the media file was played.

When the portable media player 12 is again docked to the user system 14, the play history and media selections are provided to the user system 14 (step 218). In addition, the media selections may include information defining a desired format such as, for example, MP3 or AAC for songs or MPEG or AVI for videos. The desired format may alternatively be stored in the user profile of the user associated with the portable media player 12 and the user system 14.

The user system 14 then provides the selected media files, which are the media files identified by the media selections, to the portable media player 12 (step 220). Optionally, if a particular format is desired, the user system 14 may generate copies of the selected media file in the desired format and provide the copies of the selected media files to the portable media player 12. In addition, while portable media player 12 is docked, the user system 14 provides the play history and the media selections to the central system 16, where the play history and identifiers are used to update the user profile of the user (step 222). The user system 14 then sends a request to the central system 16 for media files to preview (step 224). As stated above, steps 222 and 224 may be implemented as a single request.

In response to the request, the central system 16, and more specifically the prediction engine 54, selects a number of media files from the user's media collection to be previewed based on the play history of the portable media player 12, the play history of the user system 14, the user profile of the user, or any combination thereof (step 226). Note that by providing the media selections to the central system 16 and storing the identifiers of media files previously previewed, the prediction engine 54 may ensure that media files already previewed and/or selected are not repeatedly selected for preview. In addition, the media selections may be given greater weight than non-selected previews when selecting media files to preview. The server 46 then provides identifiers of the media files selected for preview, such as the GUIDs identifying the media content of the media files, to the user system 14 (step 228). The user system 14 then generates previews of the media files selected for preview as described above (step 230). Once generated, the previews are provided to the portable media player 12 (step 232). Note again that in this embodiment, steps 218-232 are performed during a single synchronization process. From this point, steps 214-232 may be repeated as desired.

Figure 4:
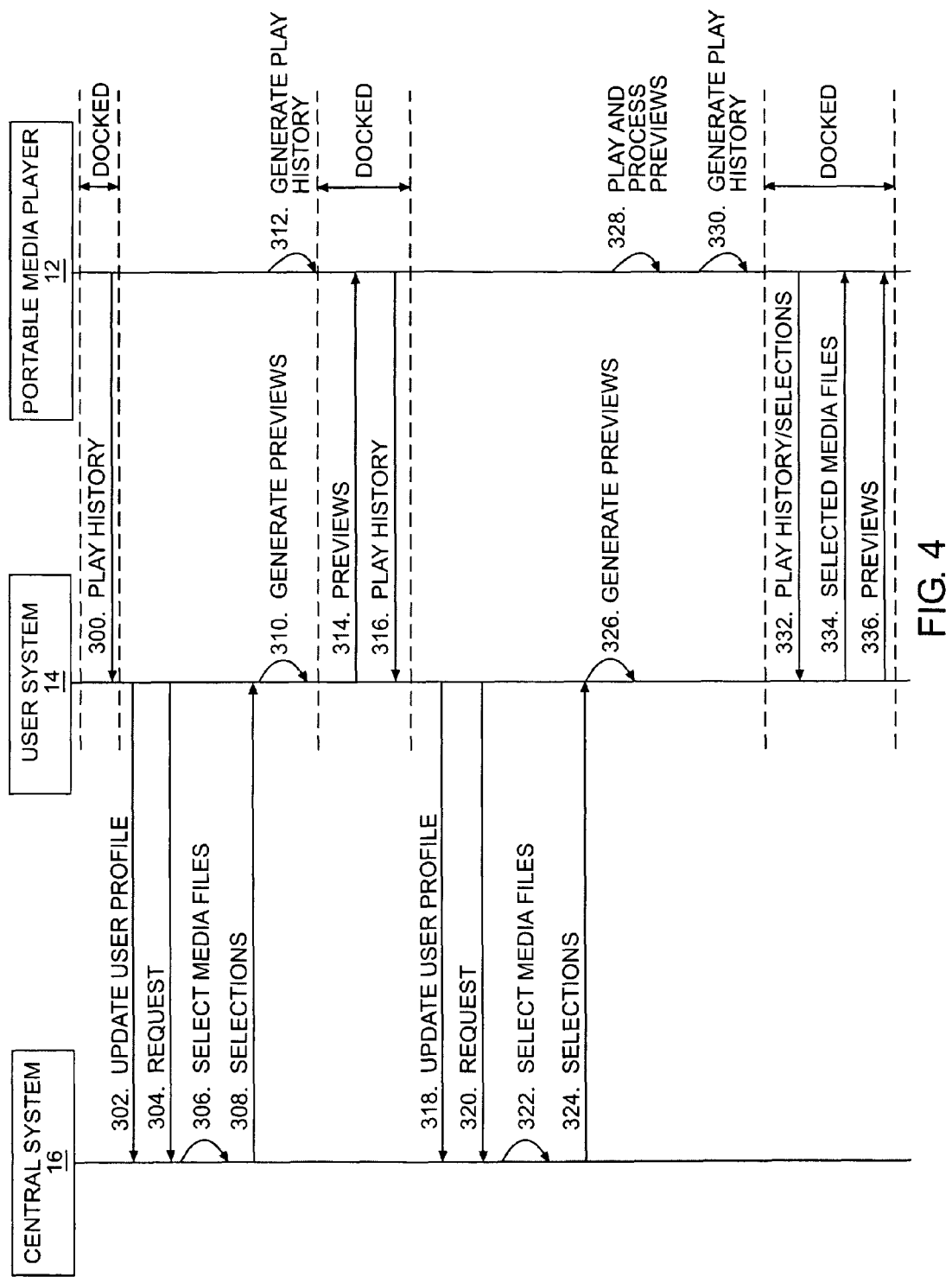
FIG. 4 illustrates the operation of the system of FIG. 1 to provide previews of media files in the user's media collection to the portable media player according to another embodiment of the present invention.

FIG. 4 is similar to FIG. 3 and illustrates the operation of the system 10 of FIG. 1 to provide previews of media files in the user's media collection to the portable media player 12 according to another embodiment of the present invention. In this embodiment, the previews provided to the portable media player 12 are generated based on a previous play history of the portable media player 12 in order to reduce the amount of time that the portable media player 12 is docked to the user system 14.

First, during a first synchronization process, the play history of the portable media player 12 is provided to the user system 14 (step 300). Note that if, for example, the portable media player 12 is new, the play history may be null or empty. As illustrated, at this point, synchronization ends, and the portable media player 12 is undocked from the user system 14. However, note that the present invention is not limited thereto. The following steps may begin before the portable media player 12 is undocked.

Upon receiving the play history, the user system 14 provides the play history of the portable media player 12 and, optionally, the play history of the user system 14 to the central system 16 in order to update the user profile of the user (step 302). The user system 14 may then send a request to the central system 16 to initiate the prediction engine 54 (step 304). Note that while steps 302 and 304 are illustrated as separate steps, they may be implemented in a single step wherein the play history of the portable media player 12 and, optionally, the play history of the user system 14 are provided in the request.

In response, the central system 16, and more specifically the prediction engine 54, selects a number of media files from the user's media collection to be previewed based on the play history of the portable media player 12, the play history of the user system 14, the user profile of the user, or any combination thereof (step 306). After selecting the media files to preview, the server 46 then provides identifiers of the selected media files, such as the GUIDs identifying the media content of the selected media files, to the user system 14 (step 308). The user system 14 then generates previews of the selected media files as described above (step 310).

While steps 302-308 are being performed, the portable media player 12 is undocked. If media files have previously been transferred to the portable media player 22, the user may select and play media files. In response, the play history for the portable media player 12 is generated, or updated, to include the identifiers of the played media files and time stamps (step 312).

When the portable media player 12 is again docked to the user system 14 for a second synchronization process, the previews generated by the user system 14 are transferred to the portable media player 12 (step 314), and the play history of the portable media player 12 is provided to the user system 14 (step 316). Note that in this embodiment, the previews provided to the portable media player 12 are selected based on the play history of the portable media player provided to the user system 14 during a previous synchronization process. As a result, the portable media player 12 need not be docked for the entire process of selecting and generating the previews, and the amount of time that the portable media player 12 is docked to the user system 14 is substantially reduced. This may be desirable in some implementations. In others, selecting the previews based on the current play history of the portable media player 12, as is the case in FIG. 3, may be desirable.

At this point, the synchronization process ends, and the portable media player 12 is undocked from the user system 14. While the portable media player 12 is undocked, the user system 14 provides the play history of the portable media player 12 and, optionally, the play history of the user system 14 to the central system 16 in order to update the user profile of the user (step 318). The user system 14 may then send a request to the central system 16 to initiate the prediction engine 54 (step 320). Note that while steps 318 and 320 are illustrated as separate steps, they may be implemented in a single step wherein the play history of the portable media player 12 and, optionally, the play history of the user system 14 are provided in the request.

In response, the central system 16, and more specifically the prediction engine 54, selects a number of media files from the user's media collection to be previewed based on the play history of the portable media player 12, the play history of the user system 14, the user profile of the user, or any combination thereof (step 322). After selecting the media files to preview, the server 46 then provides identifiers of the selected media files, such as the GUIDs identifying the media content of the selected media files, to the user system 14 (step 324). The user system 14 then generates previews of the selected media files as described above (step 326).

While the portable media player 12 is undocked, the previews previously transferred to the portable media player in step 314, or any other previews previously transferred to the portable media player 12 and not yet removed, may be played and processed on the portable media player 12 (step 328). More specifically, the previews may be played by the portable media player 12. Upon viewing or listening to each of the previews, the user may select the preview such that the preview is added to a list of media selections stored in the media selections database 28. By selecting the preview, the user indicates that the corresponding media file from the user's media collection is to be transferred to the portable media player 12 during the next synchronization process. The media selections stored in the media selections database 28 may be the identifiers, such as the GUIDs, of the selected previews, which may be the identifiers, such as the GUIDs, for the corresponding media files in the user's media collection.

In addition to playing and processing the previews, the user may select and play media files stored in the media database 22, and, in response, a play history is generated (step 330). For each media file played, the play history preferably includes the GUID identifying the media content of the media file and a time stamp identifying a time and date at which the media file was played.

When the portable media player 12 is again docked to the user system 14, the play history and media selections are provided to the user system 14 (step 332). In addition, the media selections may include information defining a desired format such as, for example, MP3 or AAC for songs or MPEG or AVI for videos. The desired format may alternatively be stored in the user profile of the user associated with the portable media player 12 and the user system 14. While not illustrated for clarity, the play history and media selections may be provided to the central system 16 to update the user profile of the user associated with the portable media player 12 and the user system 14, wherein the updated user profile may be used by the prediction engine 54 to select media files for future previews.

The user system 14 then provides the selected media files, which are the media files identified by the media selections, to the portable media player 12 (step 334). Optionally, if a particular format is desired, the user system 14 may generate copies of the selected media file in the desired format and provide the copies of the selected media files to the portable media player 12. In addition, while the portable media player 12 is docked, the previews previously generated in step 326 are provided to the portable media player 12 (step 336). Note again that in this embodiment, the previews provided to the portable media player 12 are selected based on the play history of the portable media player 12 provided to the user system 14 during previous synchronization processes. From this point, the steps 318-336 may be repeated as desired.

Figure 5A:
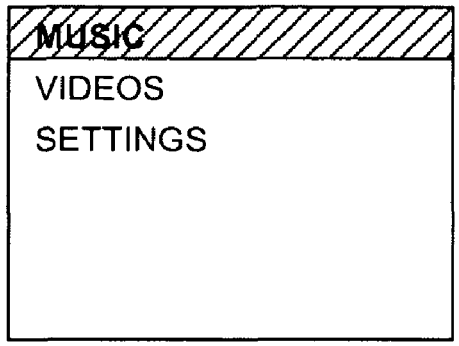
FIGS. 5A-5D illustrate an exemplary graphical user interface for the portable media player according to one embodiment of the present invention.
Figure 5B:
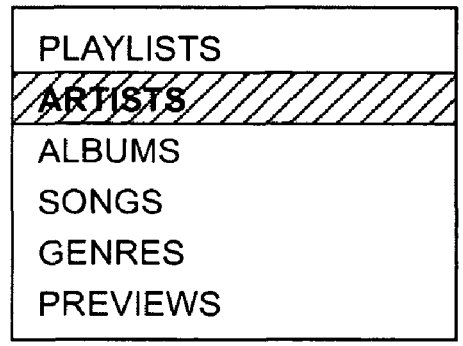

FIGS. 5A-5D illustrate an exemplary graphical user interface for the portable media player 12 enabling the user to play previews provided to the portable media player 12 according to the present invention. As illustrated in FIG. 5A, the user may first select whether he or she desires to play music, play videos, or adjust the settings of the portable media player 12. In this example, the user has selected MUSIC. Thus, as illustrated in FIG. 5B, the user may then select whether he or she desires to view a list of play lists, artists, albums, songs, genres, or previews. If the user selects play lists, a number of play lists generated by the user may then be presented to the user. Previews may be randomly, periodically, or otherwise inserted into the play lists. If the user selects artists, a list of artists for which songs or previews are stored on the portable media player 12 may then be presented to the user. In a similar fashion, lists of albums, songs, genres, and previews may be presented to the user if selected.

Figure 5C:
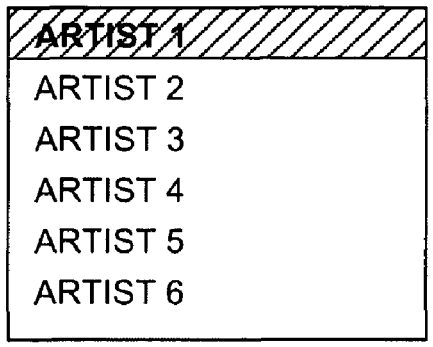
Figure 5D:
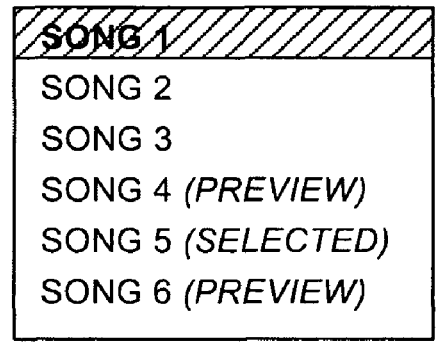

In this example, the user selects ARTISTS. As a result, a list of artists is presented to the user, as illustrated in FIG. 5C. The list of artists includes artists for which songs or previews are stored on the portable media player 12. The user may then select an artist to view a list of songs and previews stored on the portable media player 12 for the selected artist. In this example, the user has selected ARTIST 1. As a result, a list of songs and previews for the selected artist is presented to the user, as illustrated in FIG. 5D. In this example, there are three previews for the selected artist, where the previews are identified by being displayed in italics. The previews may alternatively be identified using a different font, different color, some other indicator, or any combination thereof. In addition, the previews may be identified by placing "preview" beside the song title. Previews selected by the user for transfer to the portable media player 12 may be identified by placing "selected" beside the song title.

Figure 6A:
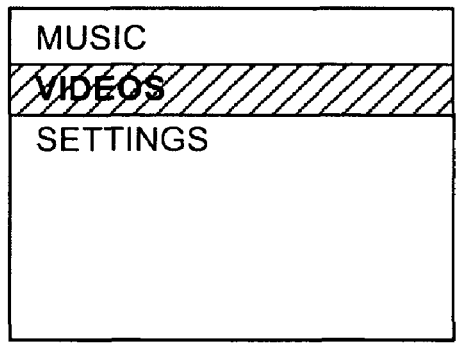
FIGS. 6A-6D illustrate the exemplary graphical user interface for the portable media player according to another embodiment of the present invention.
Figure 6B:
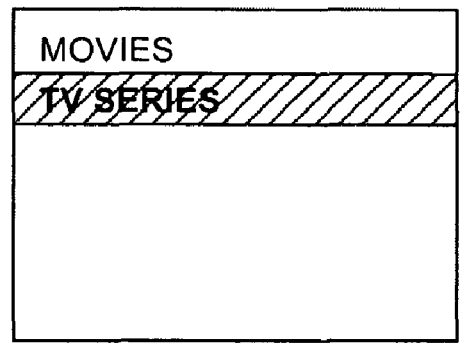
Figure 6C:
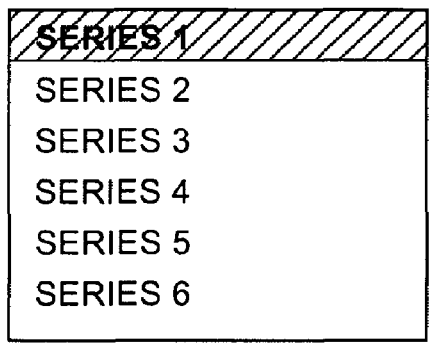
Figure 6D:
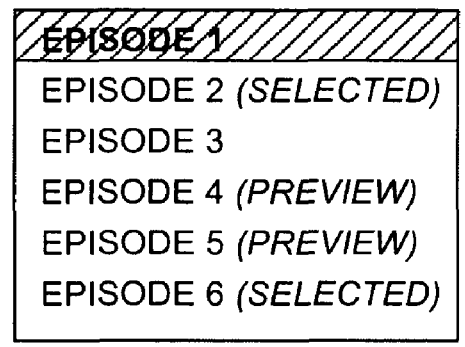

FIGS. 6A-6D are similar to FIGS. 5A-5D. However, FIGS. 6A-6D illustrate the situation where a user desires to play videos rather than music. As illustrated, the user may navigate through the graphical user interface until a list of videos is presented. As illustrated in FIG. 6D, the list of videos includes both videos and previews of videos. The previews may be identified using a different font, different color, some other indicator, or any combination thereof. In this example, the previews are identified by being displayed in italics. In addition, previews may be identified by placing "preview" beside the video title. Previews selected by the user for transfer to the portable media player 12 may be identified by placing "selected" beside the video title.

In addition to the visual indicators used in the exemplary graphical user interface of FIGS. 5A-5D and 6A-6D, previews and the status of the previews may be additionally or alternatively indicated using audible tones or messages. For example, a single audible tone may be played before a preview begins playback for the first time, two audible tones may be played before a preview that has been previously played but not selected for transfer to the portable media player 12 begins playback, and three audible tones may be played before a preview that has been selected for transfer to the portable media player 12 begins playback. In a similar fashion, prerecorded audio messages, such as "new," "selected," or the like may be played before playback of a preview to provide the status of the preview.

Further, a preview may be selected in a number of manners. In one embodiment, while the preview is being played, the user may be presented with a graphical user interface including a "select" button, wherein the user may activate the "select" button using a physical user interface of the portable media player 12. In addition or as an alternative, the user may select previews for purchase via the user interface of the portable media player 12 while the previews are not playing.

Figure 7:
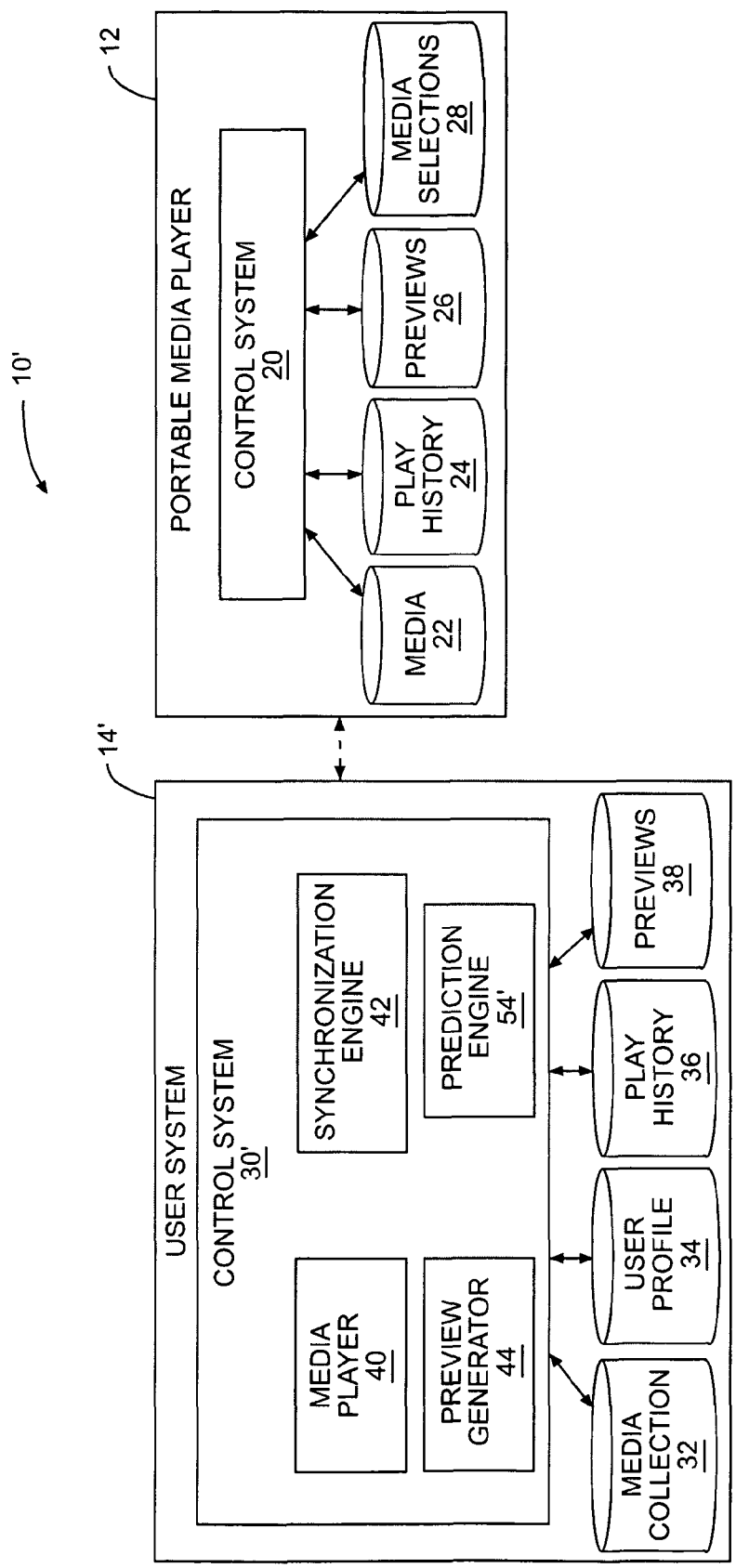
FIG. 7 illustrates a system for providing previews of media files in a user's media collection to a portable media player according to another embodiment of the present invention.

FIG. 7 illustrates a system 10' operating to provide previews to a portable media player 12 according to a second embodiment of the present invention. This embodiment is substantially the same as that discussed above. However, the prediction engine 54' is hosted by the user system 14' rather than the central system 16 (FIG. 1). Note that the central system 16 may still be beneficial for identifying the media content of the media files in the user's media collection. However, in this embodiment, the media files selected for preview are selected by the user system 14' rather than the central system 16.

Figure 8:
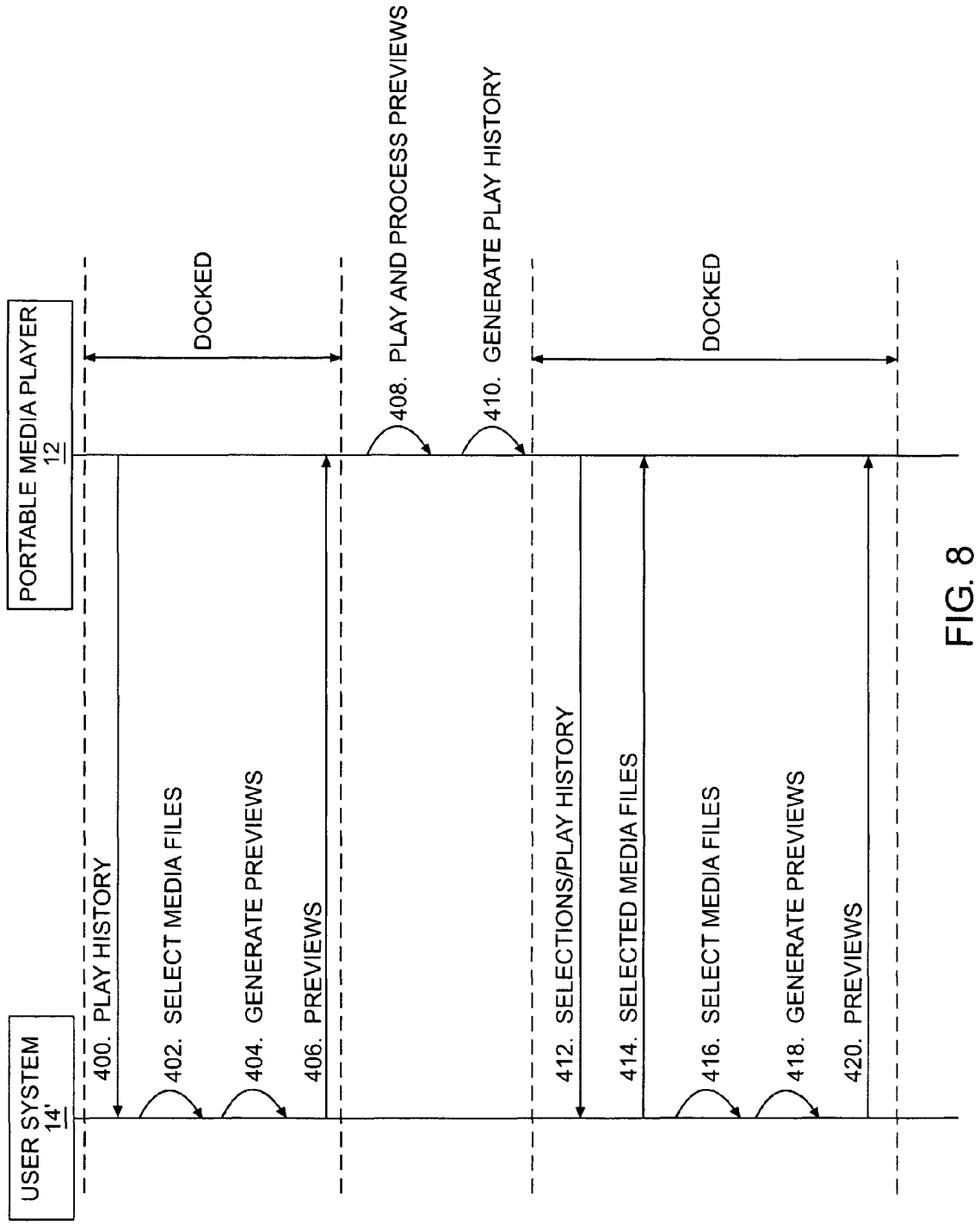
FIG. 8 illustrates the operation of the system of FIG. 7 to provide previews of media files in the user's media collection to the portable media player according to one embodiment of the present invention.

FIG. 8 illustrates the operation of the system 10' of FIG. 7 according to one embodiment of the present invention. First, the portable media player 12 is docked to the user system 14' for a first synchronization process in which the play history of the portable media player 12, if any, is provided to the user system 14' (step 400). The play history is used to update the user profile of the user stored in the user profile database 34. Next, the user system 14', and more specifically the prediction engine 54', selects a number of media files from the user's media collection to be previewed based on the play history of the portable media player 12, the play history of the user system 14', the user profile of the user, or any combination thereof, as described above (step 402). Identifiers of the selected media files are provided to the preview generator 44, which generates previews of the selected media files (404). Once generated, the previews are provided to the portable media player 12 (step 406). Note that in this embodiment, steps 400-406 are performed during a single synchronization process.

At this point, the synchronization process ends, and the portable media player 12 is undocked from the user system 14'. While the portable media player 12 undocked, the previews may be played and processed on the portable media player 12 (step 408). More specifically, the previews may be played by the portable media player 12. Upon viewing or listening to each of the previews, the user may select the preview such that the preview is added to the list of media selections stored in the media selections database 28. By selecting the preview, the user indicates that the corresponding media file from the user's media collection is to be transferred to the portable media player 12 during the next synchronization process. The media selections stored in the media selections database 28 may be the identifiers, such as the GUIDs, of the selected previews, which may also be the identifiers, such as the GUIDs, for the corresponding media files from the user's media collection.

In addition to playing and processing the previews, the user may play desired ones of the media files stored in the media database 22, and, in response, a play history is generated (step 410). For each media file played, the play history preferably includes the GUID identifying the media content of the media file and a time stamp identifying a time and date at which the media file was played.

When the portable media player 12 is again docked to the user system 14', the play history and the media selections are provided to the user system 14' (step 412). In addition, the media selections may include information defining a desired format such as, for example, MP3 or AAC for songs or MPEG or AVI for videos. The desired format may alternatively be stored in the user profile of the user associated with the portable media player 12 and the user system 14'.

The user system 14' then provides the selected media files, which are the media files identified by the media selections, to the portable media player 12 (step 414). Optionally, if a particular format is desired, the user system 14' may generate copies of the selected media files in the desired format and provide the copies of the selected media files to the portable media player 12. In addition, while portable media player 12 is docked, the user system 14' updates the user profile stored in the user profile database 34 using the play history and the media selections provided by the portable media player 12 in step 412. The user system 14' initiates the prediction engine 54', which operates to select media files for which previews are to be provided to the portable media player 12 based on the play history of the portable media player 12, the play history of the user system 14, the user profile of the user, or any combination thereof (step 416). Note that by storing the media selections and the identifiers of media files previously previewed in the user profile, the prediction engine 54' may ensure that media files already previewed and/or selected for transfer to the portable media player 12 are not repeatedly selected. In addition, the selected previews may be given greater weight than non-selected previews when selecting media files to preview.

The identifiers of the media files selected for preview, such as the GUIDs identifying the media content of the media files selected for preview, are then provided to the preview generator 44, which operates to generate previews of the media files selected for preview (step 418). Once generated, the previews are provided to the portable media player 12 (step 420). Note again that in this embodiment, steps 412-420 are performed during a single synchronization process. From this point, the steps 408-420 may be repeated as desired.

Figure 9:
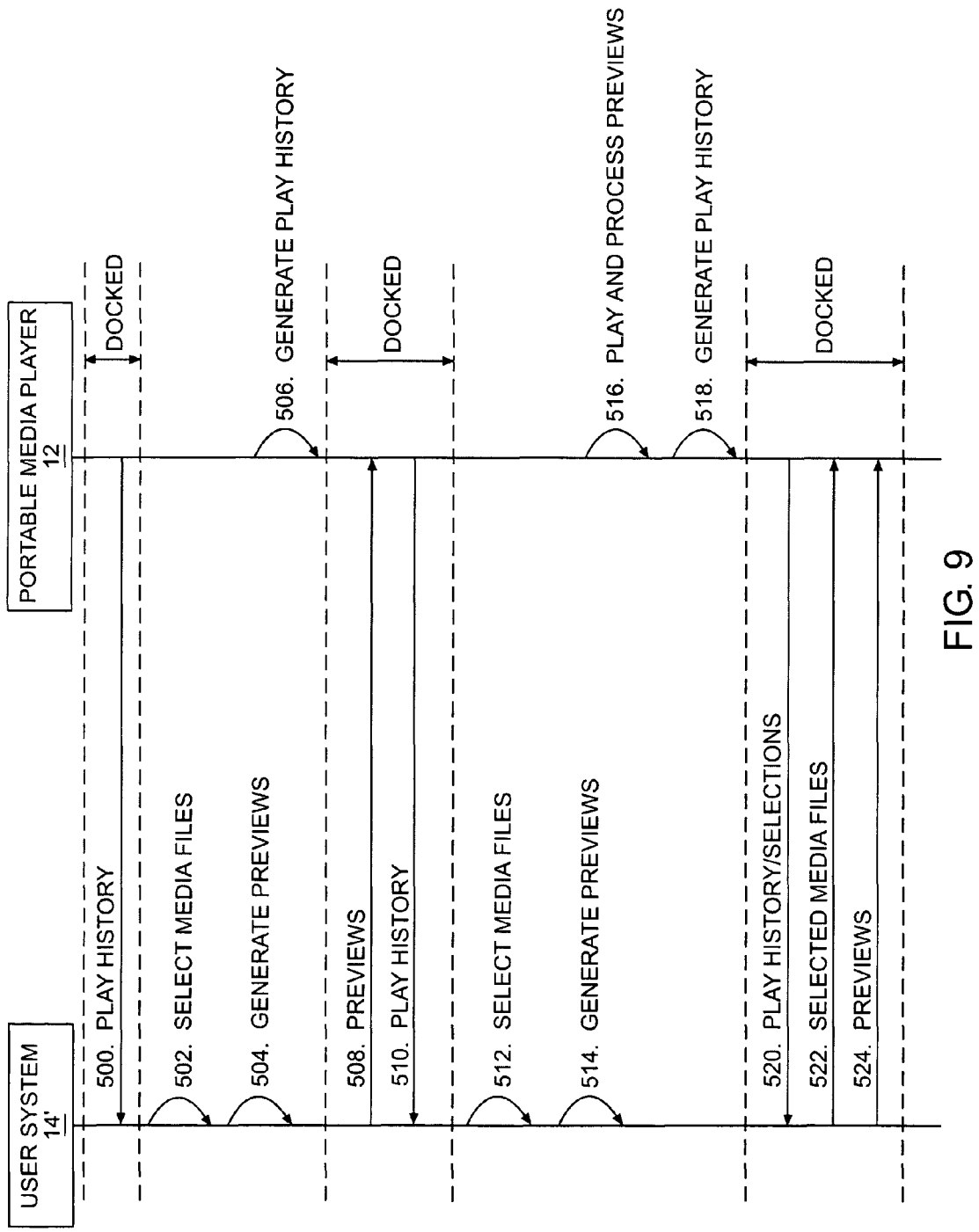
FIG. 9 illustrates the operation of the system of FIG. 7 to provide previews of media files in the user's media collection to the portable media player according to another embodiment of the present invention.

FIG. 9 is similar to FIG. 8 and illustrates the operation of the system 10' of FIG. 7 according to another embodiment of the present invention. In this embodiment, the previews provided to the portable media player 12 are generated based on a previous play history of the portable media player 12 in order to reduce the amount of time that the portable media player 12 is docked to the user system 14'.

First, the portable media player 12 is docked to the user system 14' for a first synchronization process during which the play history of the portable media player 12, if any, is provided to the user system 14' (step 500). The play history is used to update the user profile of the user stored in the user profile database 34. At this point, the portable media player 12 may be undocked.

The user system 14', and more specifically the prediction engine 54', selects a number of media files from the user's media collection to be previewed based on the play history of the portable media player 12, the play history of the user system 14', the user profile of the user, or any combination thereof, as described above (step 502). Identifiers of the media files selected for preview are provided to the preview generator 44, which generates previews of the media files (step 504). Once generated, the previews are stored in the previews database 38 until the portable media player 12 is again docked to the user system 14' for a subsequent synchronization process.

While the portable media player 12 is undocked, the user may select and play media files previously transferred to the portable media player 22. In response, the portable media player 12 generates, or updates, the play history of the portable media player 12 to include the identifiers of the played media files and time stamps (step 506).

When the portable media player 12 is again docked to the user system 14' for a second synchronization process, the previews generated by the user system 14' in step 504 are transferred to the portable media player 12 (step 508), and the play history of the portable media player 12 is provided to the user system 14' (step 510). Note that in this embodiment, the previews provided to the portable media player 12 are selected based on the play history of the portable media player 12 provided to the user system 14' during a previous synchronization process. As a result, the portable media player 12 is not docked for the entire process of selecting and generating the previews, and the amount of time that the portable media player 12 is docked to the user system 14' is substantially reduced. This may be desirable in some implementations. In others, selecting the previews based on the current play history of the portable media player, as is the case in FIG. 8, may be desirable.

At this point, the synchronization process ends, and the portable media player 12 is undocked from the user system 14'. While the portable media player 12 is undocked, the user system 14' updates the user profile of the user based on the play history provided to the user system 14' during step 510. The prediction engine 54' is then initiated to select a number of media files from the user's media collection to be previewed based on the play history of the portable media player 12, the play history of the user system 14', the user profile of the user, or any combination thereof (step 512). After selecting the media files to preview, the identifiers of the selected media files, such as the GUIDs identifying the media content of the selected media files, are provided to the preview generator 44, which operates to generate previews of the selected media files (step 514).

While the portable media player 12 is undocked, the previews previously transferred to the portable media player 12 in step 508, or any other previews previously transferred to the portable media player 12 and not yet removed, may be played and processed on the portable media player 12 (step 516). More specifically, the previews may be played by the portable media player 12. Upon viewing or listening to each of the previews, the user may select the preview such that the preview is added to the list of media selections stored in the media selections database 28. By selecting the preview, the user indicates that the corresponding media file from the user's media collection is to be transferred to the portable media player 12 during the next synchronization process. The media selections stored in the media selections database 28 may be the identifiers, such as the GUIDs, of the selected previews, which may be the identifiers, such as the GUIDs, for the corresponding media files in the user's media collection.

In addition to playing and processing the previews, the user may select and play media files stored in the media database 22, and, in response, a play history is generated (step 518). For each media file played, the play history preferably includes the GUID identifying the media content of the media file and a time stamp identifying a time and date at which the media file was played.

When the portable media player 12 is again docked to the user system 14', the play history and media selections are provided to the user system 14' (step 520). In addition, the media selections may include information defining a desired format such as, for example, MP3 or AAC for songs or MPEG or AVI for videos. The desired format may alternatively be stored in the user profile of the user associated with the portable media player 12 and the user system 14'. The user system 14' then provides the selected media files, which are the media files identified by the media selections, to the portable media player 12 (step 522). Optionally, if a particular format is desired, the user system 14' may generate copies of the selected media files in the desired format and provide the copies of the selected media files to the portable media player 12. In addition, while the portable media player 12 is docked, the previews previously generated in step 514 are provided to the portable media player 12 (step 524). Note again that in this embodiment, the previews provided to the portable media player 12 are selected based on the play history of the portable media player 12 provided to the user system 14' during previous synchronization processes. From this point, the steps 512-524 may be repeated as desired.

Figure 10:
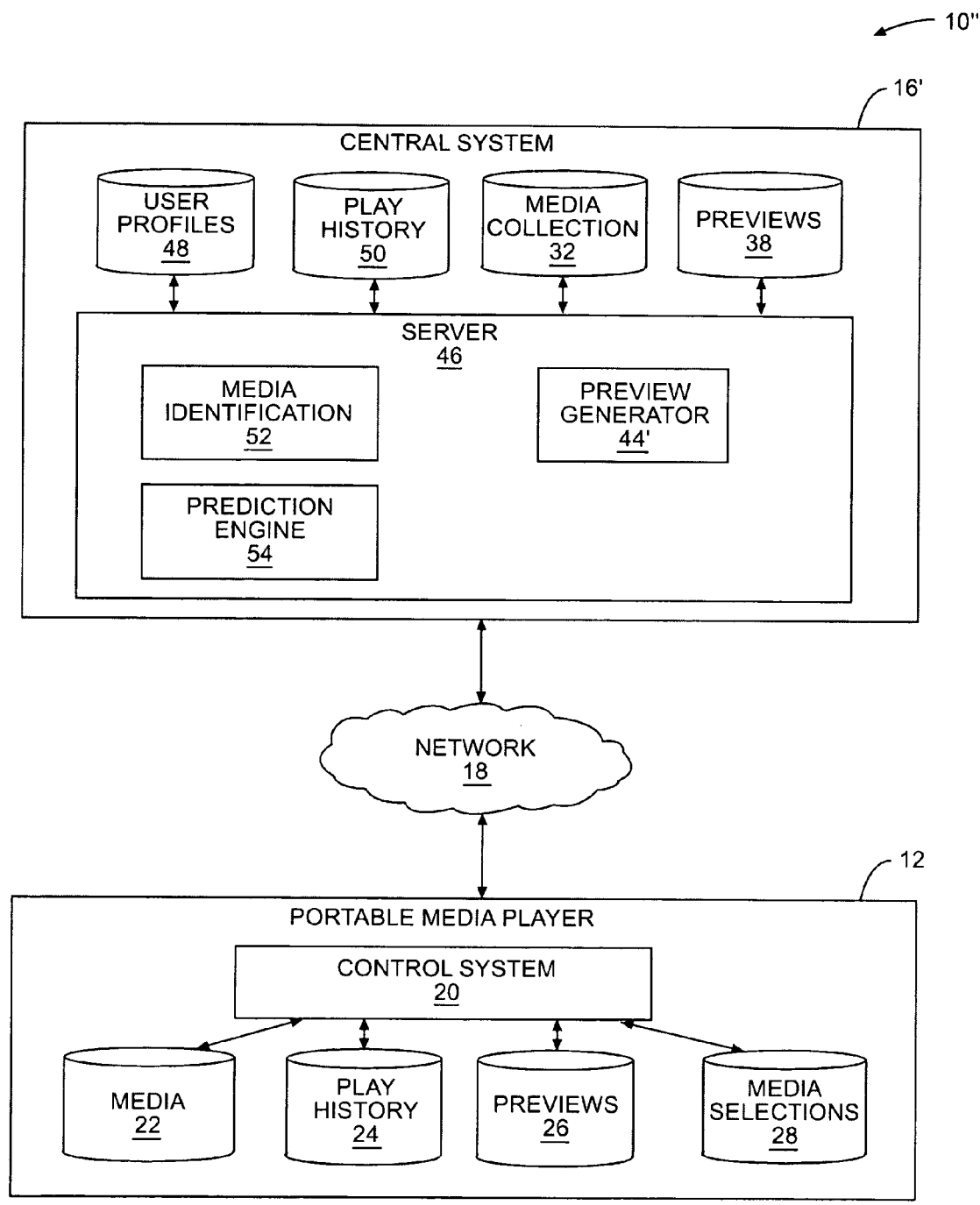
FIG. 10 illustrates a system for providing previews of media files in a user's media collection to a portable media player according to another embodiment of the present invention.

FIG. 10 illustrates a system 10" operating to provide previews to a portable media player 12 according to a second embodiment of the present invention. This embodiment is similar to that in FIG. 1. However, in this embodiment, the portable media player 12 is equipped with a wireless communication interface communicatively coupling the portable media player 12 to the network 18. The wireless communication interface may be a cellular interface coupling the portable media player 12 to a cellular network, a local wireless interface such as an IEEE 802.11 wireless interface coupling the portable media player 12 to an access point associated with the network 18, or the like. In addition, the user's media collection, and optionally the previews of the user's media collection, is hosted by the central system 16' rather than the user system 14 (FIG. 1).

Figure 11:
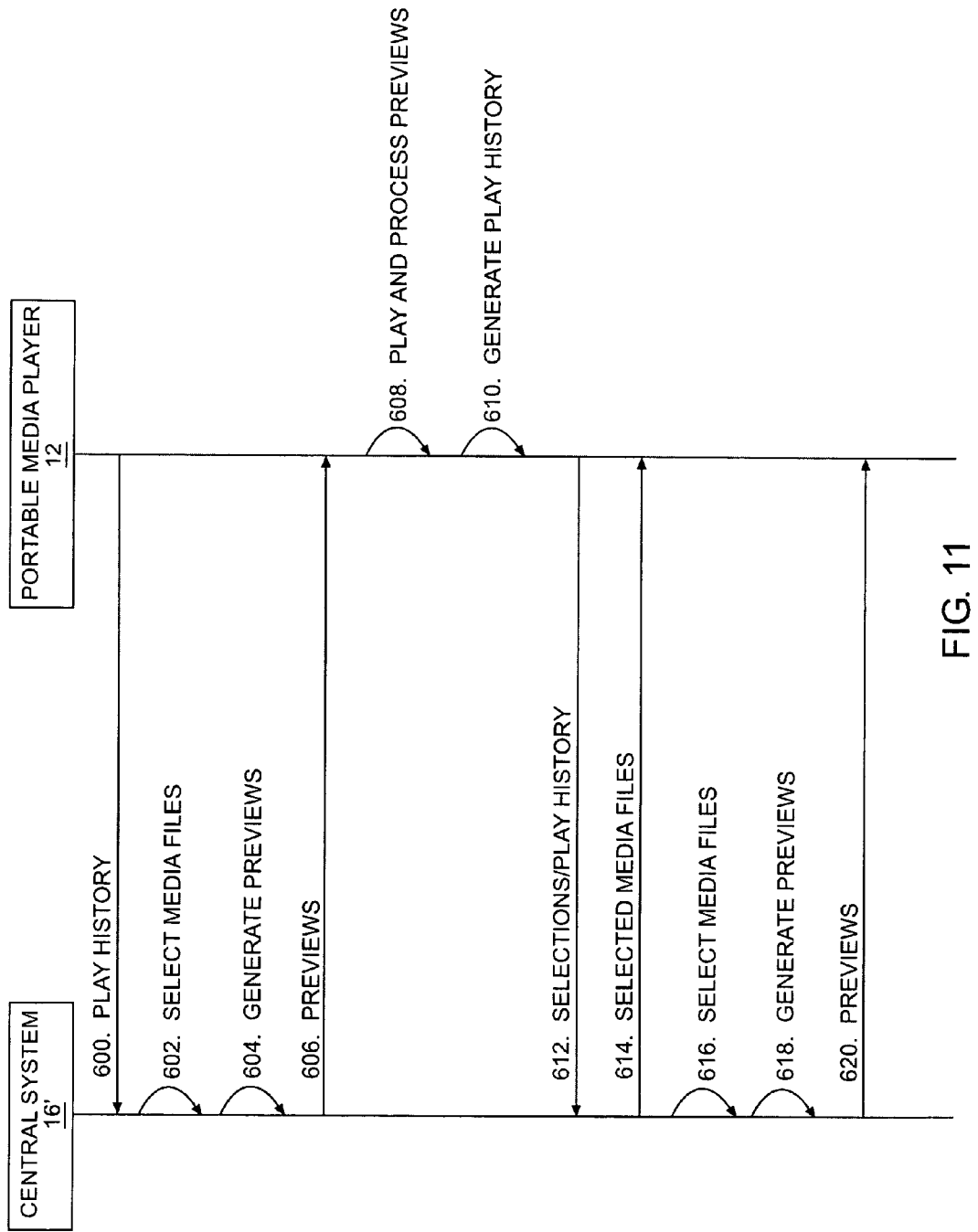
FIG. 11 illustrates the operation of the system of FIG. 10 to provide previews of media files in the user's media collection to the portable media player according to one embodiment of the present invention.

FIG. 11 illustrates the operation of the system 10" of FIG. 10 according to one embodiment of the present invention. First, the portable media player 12 communicates the play history of the portable media player 12, if any, to the central system 16' (step 600). The play history is used to update the user profile of the user stored in the user profiles database 48. Note that the play history may be provided to the central system 16' periodically or as part of a request for previews. Next, the central system 16', and more specifically the prediction engine 54, selects a number of media files from the user's media collection to be previewed based on the play history of the portable media player 12, optionally the play history of the user system 14, the user profile of the user, or any combination thereof, as described above (step 602). Identifiers of the selected media files are provided to the preview generator 44', which generates previews of the selected media files (604). The previews are then provided to the portable media player 12 (step 606) via the network 18. Note that steps 602-606 may be performed automatically in response to receiving the play history from the portable media player 12. Alternatively steps 602 and 604 may be performed periodically in response to receiving periodic updates from the portable media player 12 such that the previews are pre-generated. Thereafter, the previews may be provided to the portable media player 12 in step 606 in response to a request. By pre-generating the previews, the time required to provide the previews to the portable media player 12 in response to a request is substantially reduced.

At this point, the previews may be played and processed on the portable media player 12 (step 608). More specifically, upon viewing or listening to each of the previews, the user may select the preview such that the preview is added to the list of media selections stored in the media selections database 28. By selecting the preview, the user indicates that the corresponding media file from the user's media collection is to be obtained from the central system 16'. The media selections stored in the media selections database 28 may be the identifiers, such as the GUIDs, of the selected previews, which may also be the identifiers, such as the GUIDs, for the corresponding media files from the user's media collection.

In addition to playing and processing the previews, the user may play desired ones of the media files stored in the media database 22, and, in response, a play history is generated (step 610). For each media file played, the play history preferably includes the GUID identifying the media content of the media file and a time stamp identifying a time and date at which the media file was played.

At some point, the media selections and the play history of the media selections are provided to the central system 16' (step 612). In addition, the media selections may include information defining a desired format such as, for example, MP3 or AAC for songs or MPEG or AVI for videos. The desired format may alternatively be stored in the user profile of the user associated with the portable media player 12 and the user system 14'. Note that in this example, the media selections are provided to the central system 16' along with the play history. However, the present invention is not limited thereto. The media selections may be provided to the central system 16' as the media selections are made, periodically, or upon request by the user.

The central system 16' then provides the selected media files, which are the media files identified by the media selections, to the portable media player 12 (step 614). Optionally, if a particular format is desired, the central system 16' may generate copies of the selected media files in the desired format and provide the copies of the selected media files to the portable media player 12.

In addition, the user profile stored in the user profile database 34 may be updated using the play history and the media selections provided by the portable media player 12 in step 612, and the central system 16' may initiate the prediction engine 54, which operates to select media files for which previews are to be provided to the portable media player (step 616). The identifiers of the media files selected for preview, such as the GUIDs identifying the media content of the media files selected for preview, are then provided to the preview generator 44', which operates to generate previews of the media files selected for preview (step 618). Thereafter, the previews may be provided to the portable media player 12 as described above (step 620).

Figure 12:
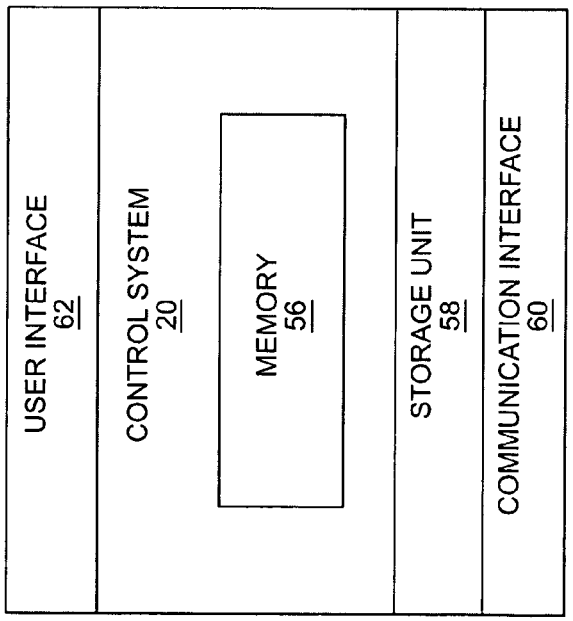
FIG. 12 is a block diagram of the portable media player of FIGS. 1, 7, and 10 according to one embodiment of the present invention.

FIG. 12 is a block diagram of an exemplary embodiment of the portable media player 12 of FIGS. 1, 7, and 10. In general, the portable media player 12 includes the control system 20 having associated memory 56. The memory 56 operates to store software instructing the portable media player 12 to operate according to the present invention. The portable media player 12 also includes a storage unit 58, which may be, for example, a hard-disc drive or the like. The databases 22-28 (FIG. 1) may be implemented in the storage unit 58. Alternatively, the databases 22-28, or a portion thereof, may be implemented in the memory 56. The portable media player 12 also includes a communication interface 60. In the embodiments of FIGS. 1 and 7, the communication interface 60 enables communication with the user system 14, 14' and may be a wireless or wired interface. In the embodiment of FIG. 10, the communication interface 60 may be a wireless interface communicatively coupling the portable media player 12 to the network 18. In addition, the portable media player 12 includes a user interface 62, which may include a display, speakers, input buttons or dials, or the like.

Figure 13:
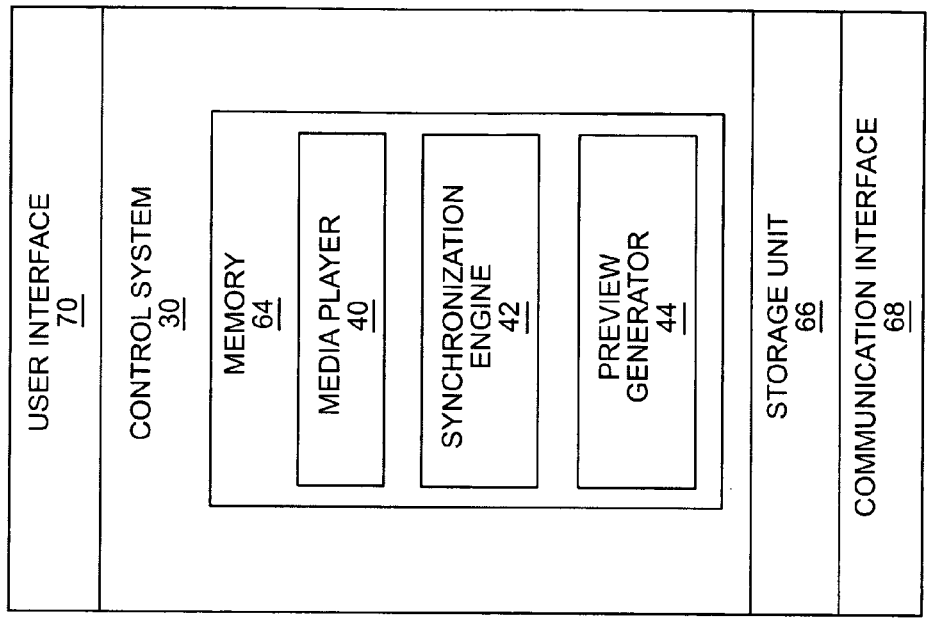
FIG. 13 is a block diagram of the user system of FIG. 1 according to one embodiment of the present invention.

FIG. 13 is a block diagram of an exemplary embodiment of the user system 14 of FIG. 1. In general, the user system 14 includes the control system 30 having associated memory 64. The memory 64 operates to store software instructing the user system 14 to operate according to the present invention. In this example, the media player 40, the synchronization engine 42, and the preview generator 44 are implemented, at least in part, in software and are stored in the memory 64. The user system 14 also includes a storage unit 66, which may be, for example, a hard-disc drive or the like. The databases 32-38 (FIG. 1) may be implemented in the storage unit 66. Alternatively, the databases 32-38, or a portion thereof, may be implemented in the memory 64. The user system 14 also includes a communication interface 68. The communication interface 68 may include a first interface communicatively coupling the user system 14 to the network 18 (FIG. 1) and a second interface providing either wireless or wired communication with the portable media player 12 (FIG. 1) during a docking, or synchronization, process. In addition, the user system 14 includes a user interface 70, which may include a display, speakers, one or more input devices, or the like.

Figure 14:
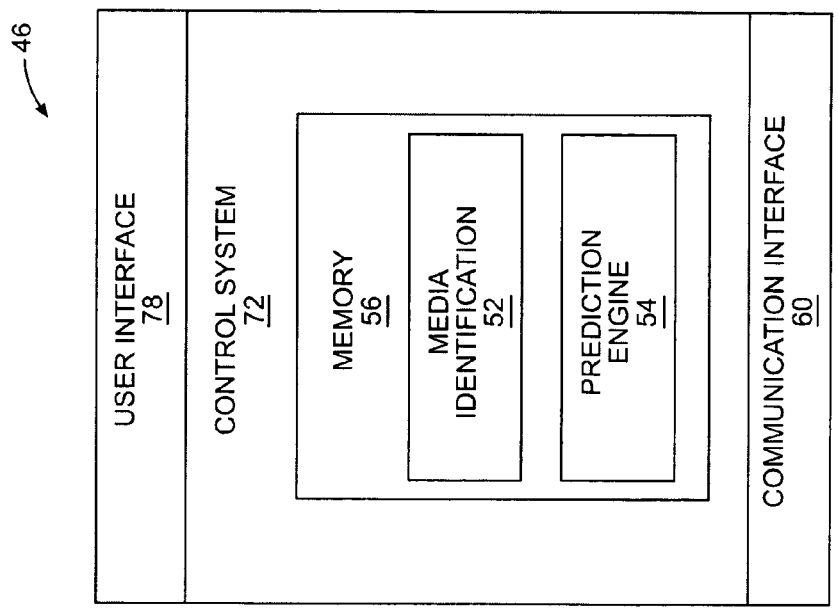
FIG. 14 is a block diagram of the server of the central system of FIG. 1 according to one embodiment of the present invention.

FIG. 14 is a block diagram of an exemplary embodiment of the server 46 of the central system 16 of FIG. 1. In general, the server 46 includes a control system 72 having associated memory 74. The memory 74 operates to store software instructing the server 46 to operate according to the present invention. In this example, the media identification application 52 and the prediction engine 54 are implemented, at least in part, in software and are stored in the memory 74. The databases 48 and 50 (FIG. 1) may be implemented in one or more storage units associated with the server 46. Alternatively, the databases 48 and 50, or a portion thereof, may be implemented in the memory 74. The server 46 also includes a communication interface 76. The communication interface 76 communicatively couples the server 46 to the network 18 (FIG. 1). In addition, the server 46 includes a user interface 78, which may include a display, speakers, one or more input devices, or the like.

Figure 15:
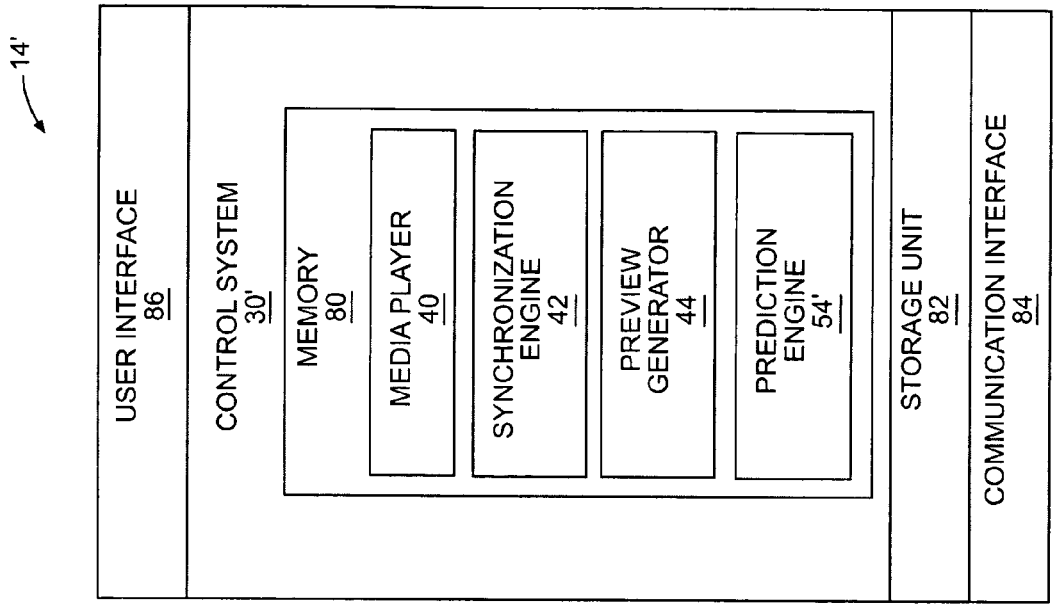
FIG. 15 is a block diagram of the user system of FIG. 7 according to one embodiment of the present invention.

FIG. 15 is a block diagram of an exemplary embodiment of the user system 14' of FIG. 7. In general, the user system 14' includes the control system 30' having associated memory 80. The memory 80 operates to store software instructing the user system 14' to operate according to the present invention. In this example, the media player 40, the synchronization engine 42, the preview generator 44, and the prediction engine 54' are implemented, at least in part, in software and are stored in the memory 80. The user system 14' also includes a storage unit 82, which may be, for example, a hard-disc drive or the like. The databases 32-38 (FIG. 7) may be implemented in the storage unit 82. Alternatively, the databases 32-38, or a portion thereof, may be implemented in the memory 80. The user system 14' also includes a communication interface 84. The communication interface 84 may include a first interface providing either wireless or wired communication with the portable media player 12 (FIG. 1) during a docking, or synchronization, process and an optional second interface communicatively coupling the user system 14' to the network 18 (FIG. 7). In addition, the user system 14' includes a user interface 86, which may include a display, speakers, one or more input devices, or the like.

Figure 16:
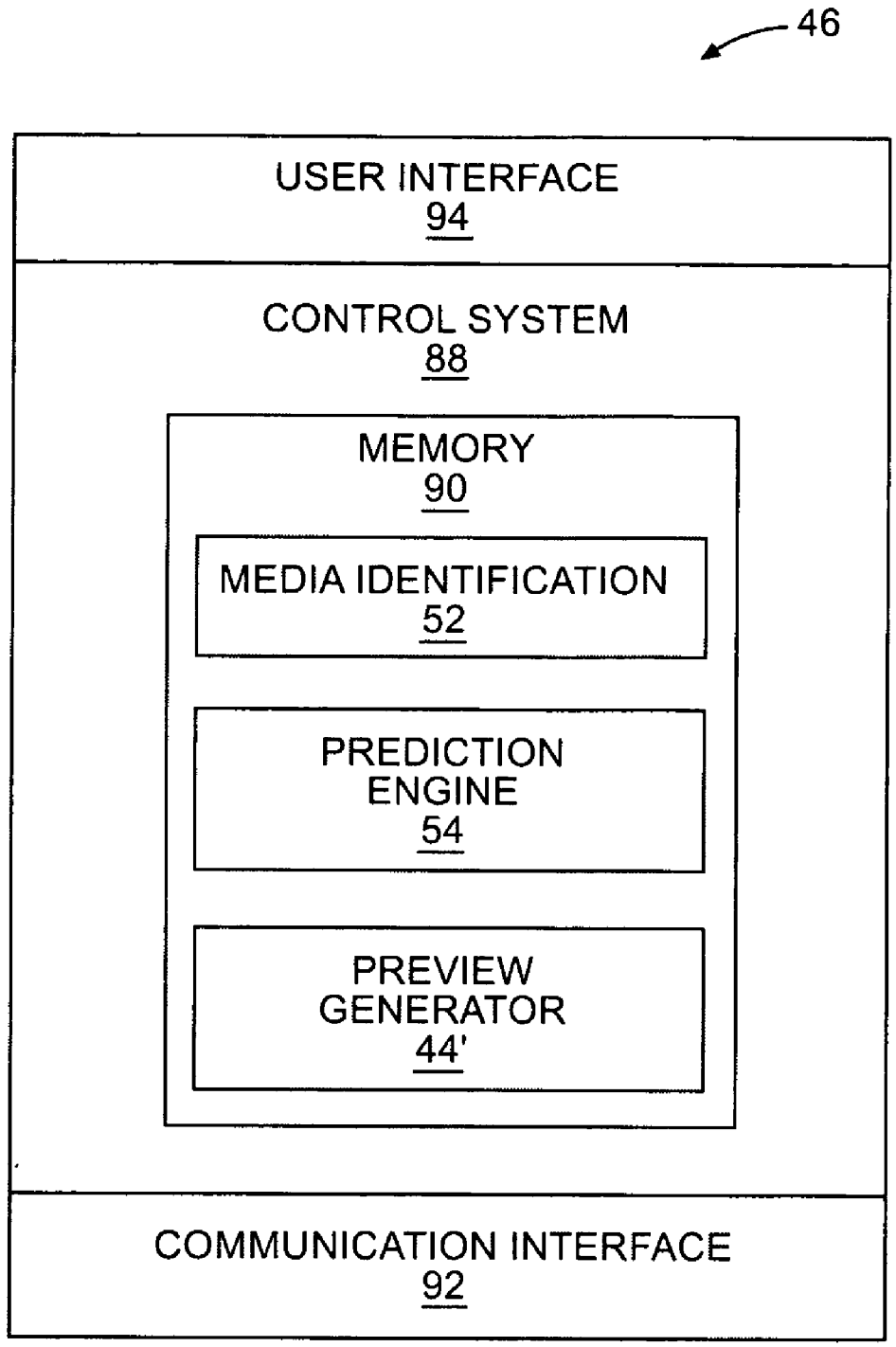
FIG. 16 is a block diagram of the server of the central system of FIG. 10 according to one embodiment of the present invention.

FIG. 16 is a block diagram of an exemplary embodiment of the server 46 of the central system 16' of FIG. 10. In general, the server 46 includes a control system 88 having associated memory 90. The memory 90 operates to store software instructing the server 46 to operate according to the present invention. In this example, the media identification application 52, the prediction engine 54, and the preview generator 44' are implemented, at least in part, in software and are stored in the memory 90. The databases 32, 38, 48, 50 (FIG. 1) may be implemented in one or more storage units associated with the server 46. Alternatively, the databases, or a portion thereof, may be implemented in the memory 90. The server 46 also includes a communication interface 92. The communication interface 92 communicatively couples the server 46 to the network 18 (FIG. 1). In addition, the server 46 includes a user interface 94, which may include a display, speakers, one or more input devices, or the like.

Those skilled in the art will recognize improvements and modifications to the preferred embodiments of the present invention. All such improvements and modifications are considered within the scope of the concepts disclosed herein and the claims that follow.

What is claimed is:

1. A method of operating a portable media player for previewing a user's media collection on the portable media player comprising:
   generating a play history identifying media files played by the portable media player prior to a first synchronization process, the media files having distinct characteristics;
   providing the play history to an associated system during the first synchronization process;
   receiving, at the portable media player from the associated system, a plurality of previews that are previews of media files selected, at least in part, based on a user profile of a user associated with the portable media player and the associated system, wherein the user profile comprises information selected from a group consisting of at least one user preference and demographic information regarding the user, the plurality of previews being previews of media files programmatically selected by the associated system from the user's media collection, which is stored on the associated system, wherein the plurality of previews are previews of media files selected based on the distinct characteristics of the media files in the play history, the plurality of previews having characteristics related to the distinct characteristics of the media files played by the portable media player;
   playing the plurality of previews on the portable media player;
   identifying a select one of the plurality of previews at the portable media player; and
   obtaining, by the portable media player, a one of the media files corresponding to the select one of the plurality of previews from the associated system.

2. The method of claim 1 wherein the plurality of previews are previews of media files further selected based on a play history of the associated system.

3. The method of claim 1 wherein the plurality of previews are previews of media files selected, at least in part, based on information identifying previews previously transferred to the portable media player.

4. The method of claim 1 wherein the plurality of previews are previews of media files selected, at least in part, based on information identifying media files for which previews were previously transferred to the portable media player and identified at the portable media player for transfer to the portable media player.

5. The method of claim 1 wherein obtaining the one of the media files corresponding to the select one of the plurality of previews comprises:
   providing information identifying the select one of the plurality of previews to the associated system during the first synchronization process; and
   receiving the one of the media files corresponding to the select one of the plurality of previews from the associated system during the first synchronization process.

6. The method of claim 5 wherein obtaining the one of the media files corresponding to the select one of the plurality of previews further comprises:
   providing information identifying a desired one of a plurality of formats for the one of the media files corresponding to the select one of the plurality of previews.

7. The method of claim 1 further comprising providing information identifying a desired one of a plurality of formats for the plurality of previews to the associated system, wherein the plurality of previews are provided to the portable media player in the desired one of the plurality of formats.

8. The method of claim 1 wherein the associated system is a central system and the portable media player is communicatively coupled to the central system via a network, further wherein:
   receiving the plurality of previews comprises receiving the plurality of previews of media files from the central system via the network; and obtaining the one of the media files comprises obtaining the one of the media files corresponding to the select one of the plurality of previews from the central system via the network.

9. A portable media player comprising:
a communication interface adapted to communicatively couple the portable media player to an associated system; and
a control system adapted to:
generate a play history identifying media files played by the portable media player prior to a first synchronization process, the media files having distinct characteristics;
provide the play history to the associated system during the first synchronization process;
receive, from the associated system, a plurality of previews of media files selected, at least in part, based on a user profile of a user associated with the portable media player and the associated system, wherein the user profile comprises information selected from a group consisting of at least one user preference and demographic information regarding the user, the plurality of previews of media files being programmatically selected by the associated system from a user's media collection stored by the associated system, wherein the plurality of previews of media files are selected based on the distinct characteristics of the media files in the play history, the plurality of previews having characteristics related to the distinct characteristics of the media files played by the portable media player;
play the plurality of previews;
select a select one of the plurality of previews; and
obtain a one of the media files corresponding to the select one of the plurality of previews from the associated system.

10. The portable media player of claim 9 wherein the associated system is an associated user system and the control system is further adapted to:
obtain the one of the media files corresponding to the select one of the plurality of previews from the associated user system during a subsequent synchronization process.

11. The portable media player of claim 9 wherein the plurality of previews are previews of media files further selected based on a play history of the associated system.

12. The portable media player of claim 9 wherein the associated system is a central system and the portable media player is communicatively coupled to the central system via a network, the control system further adapted to:
receive the plurality of previews from the central system via the network; and
obtain the one of the media files corresponding to the select one of the plurality of previews from the central system via the network.

13. The method of claim 1 wherein the plurality of previews are received from the associated system during a second synchronization process.

14. The portable media player of claim 9 wherein the control system is further adapted to receive the plurality of previews of media files from the associated system during a second synchronization process.

15. A portable media player comprising:
a communication interface adapted to communicatively couple the portable media player to an associated system; and
a control system adapted to:
generate a play history identifying media files played by the portable media player prior to a first synchronization process, the media files having distinct characteristics;
provide the play history to the associated system during the first synchronization process;
receive during a second synchronization process, from the associated system, a plurality of previews of media files selected, at least in part, based on a user profile of a user associated with the portable media player and the associated system, wherein the user profile comprises information selected from a group consisting of at least one user preference and demographic information regarding the user, the plurality of previews of media files being programmatically selected by the associated system from a user's media collection stored by the associated system, wherein the plurality of previews of media files are selected based on the distinct characteristics of the media files in the play history, the plurality of previews having characteristics related to the distinct characteristics of the media files played by the portable media player;
play the plurality of previews;
select a select one of the plurality of previews; and
obtain a one of the media files corresponding to the select one of the plurality of previews from the associated system.

16. The method of claim 1, wherein the distinct characteristics comprise a music genre.

17. The method of claim 1, wherein the distinct characteristics comprise an artist.

18. The method of claim 1, wherein the distinct characteristics comprise music from a given time period.

19. The method of claim 1, wherein the distinct characteristics comprise video content.

* * * * *